(12) United States Patent
Hattori et al.

(10) Patent No.: US 8,882,072 B2
(45) Date of Patent: Nov. 11, 2014

(54) SHAFT SUPPORT STRUCTURE AND CLIP

(75) Inventors: Kenji Hattori, Utsunomiya (JP); Taku Hirama, Utsunomiya (JP)

(73) Assignee: Nifco Inc., Yokohama-Shi (JP)

( * ) Notice: Subject to any disclaimer, the term of this patent is extended or adjusted under 35 U.S.C. 154(b) by 0 days.

(21) Appl. No.: 13/504,003

(22) PCT Filed: Oct. 14, 2010

(86) PCT No.: PCT/JP2010/068090
§ 371 (c)(1),
(2), (4) Date: May 18, 2012

(87) PCT Pub. No.: WO2011/052393
PCT Pub. Date: May 5, 2011

(65) Prior Publication Data
US 2012/0223207 A1    Sep. 6, 2012

(30) Foreign Application Priority Data

Oct. 26, 2009 (JP) ................................. 2009-245571
Jun. 16, 2010 (JP) ................................. 2010-137124
Jul. 5, 2010 (JP) ................................. 2010-153092

(51) Int. Cl.
| A47B 91/00 | (2006.01) |
| A47B 95/00 | (2006.01) |
| B65D 19/00 | (2006.01) |
| B29C 45/33 | (2006.01) |
| F16L 3/10 | (2006.01) |
| F16B 21/07 | (2006.01) |
| H02G 3/32 | (2006.01) |
| B29C 45/00 | (2006.01) |
| B29L 31/00 | (2006.01) |

(52) U.S. Cl.
CPC ............ *F16B 21/075* (2013.01); *B29C 45/0017* (2013.01); *B29C 45/006* (2013.01); *B29C 45/33* (2013.01); *F16L 3/1075* (2013.01); *B29L 2031/7282* (2013.01); *H02G 3/32* (2013.01)
USPC ...... 248/346.03; 248/65; 248/74.1; 248/74.4; 248/230.1; 248/51

(58) Field of Classification Search
USPC ............. 248/49, 65, 74.1, 74.4, 230.1, 230.4, 248/231.51
See application file for complete search history.

(56) References Cited

U.S. PATENT DOCUMENTS 5,184,794 A * 2/1993 Saito ........................... 248/68.1
5,884,372 A * 3/1999 Anscher et al. ................. 24/339

(Continued)

FOREIGN PATENT DOCUMENTS

JP    H03272311 A    12/1991
JP    H06-074802 B2    3/1994

(Continued)

*Primary Examiner* — Bradley Duckworth
*Assistant Examiner* — Asha Puttaiah
(74) *Attorney, Agent, or Firm* — Manabu Kanesaka

(57) ABSTRACT

A shaft support structure includes a base body having an attachment device for fixing an attached member, a bearing portion provided at an end portion of the base body and having an opening portion, a swinging shaft rotatably disposed inside the opening portion of the bearing portion, and a lid body having the swinging shaft and rotated by the swinging shaft. The lid body is integrally formed with the base body. A clip includes the shaft support structure.

5 Claims, 21 Drawing Sheets

(56) References Cited

U.S. PATENT DOCUMENTS

| | | | |
|---|---|---|---|
| 6,053,458 A * | 4/2000 | Meyer | 248/74.1 |
| 6,154,927 A | 12/2000 | Oi et al. | |
| 6,809,257 B2 * | 10/2004 | Shibuya | 174/481 |
| 2002/0125388 A1 * | 9/2002 | Eslick | 248/230.4 |
| 2005/0284989 A1 * | 12/2005 | Mizukoshi | 248/65 |
| 2006/0006292 A1 * | 1/2006 | Kleeb et al. | 248/74.1 |
| 2007/0215757 A1 * | 9/2007 | Yuta | 248/68.1 |
| 2007/0246614 A1 * | 10/2007 | Allmann et al. | 248/65 |

FOREIGN PATENT DOCUMENTS

| | | |
|---|---|---|
| JP | H08-68406 | 3/1996 |
| JP | H10-252718 A | 9/1998 |
| JP | 2004-36725 | 2/2004 |
| JP | 2008-224003 A | 9/2008 |

* cited by examiner

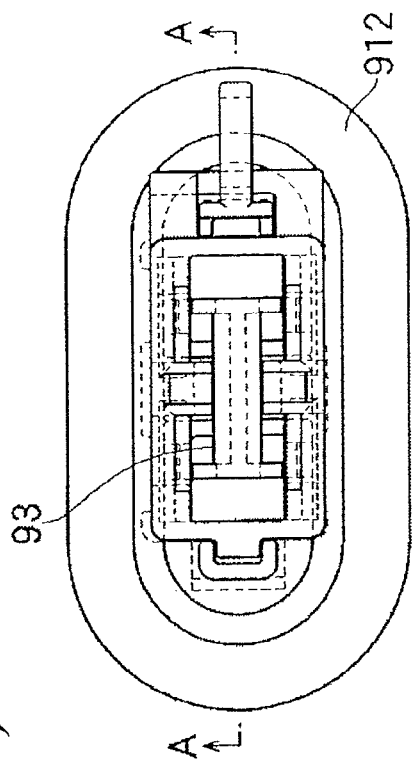
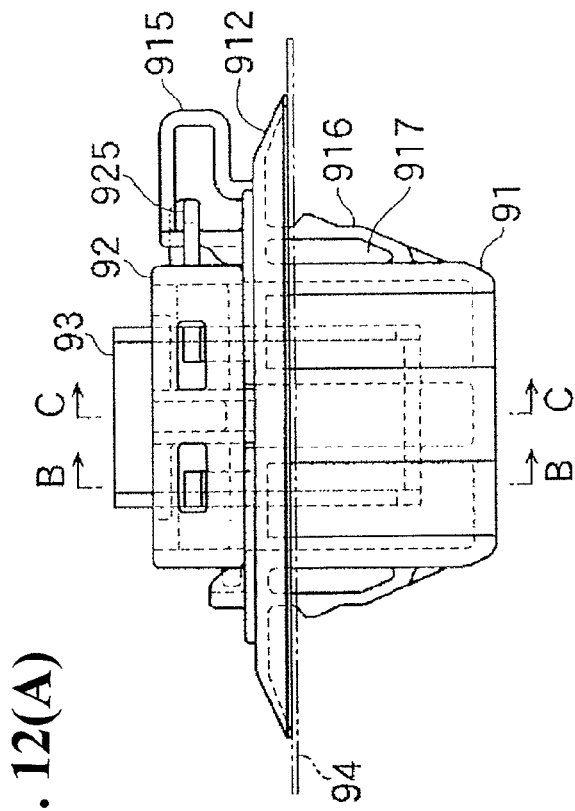
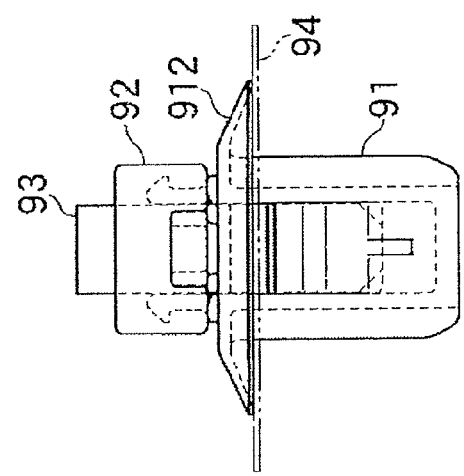
Fig. 12(B)
Fig. 12(A)
Fig. 12(C)

Fig. 13
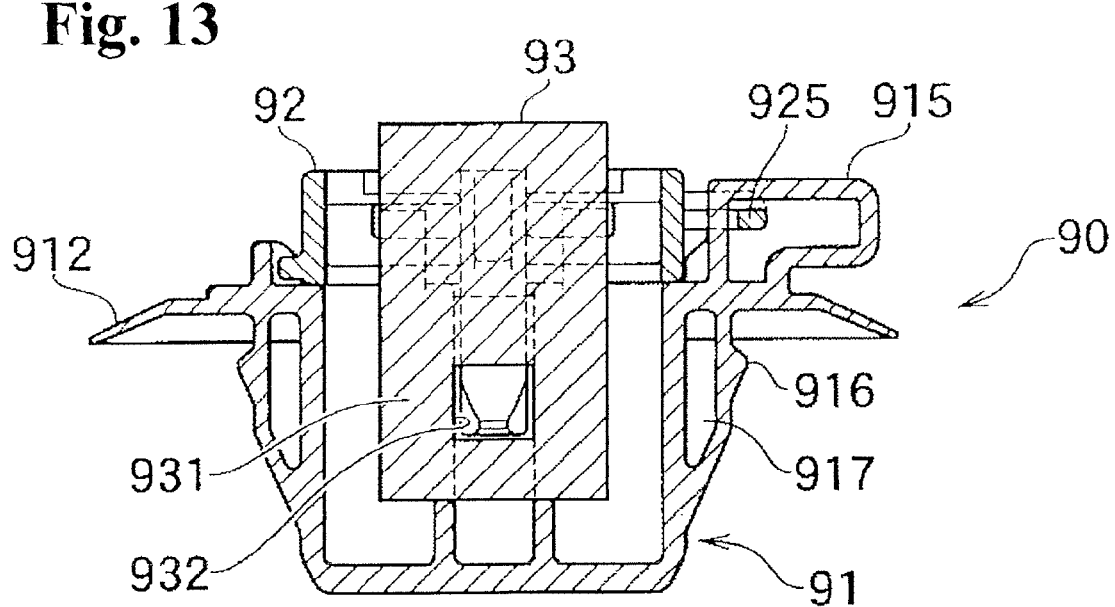
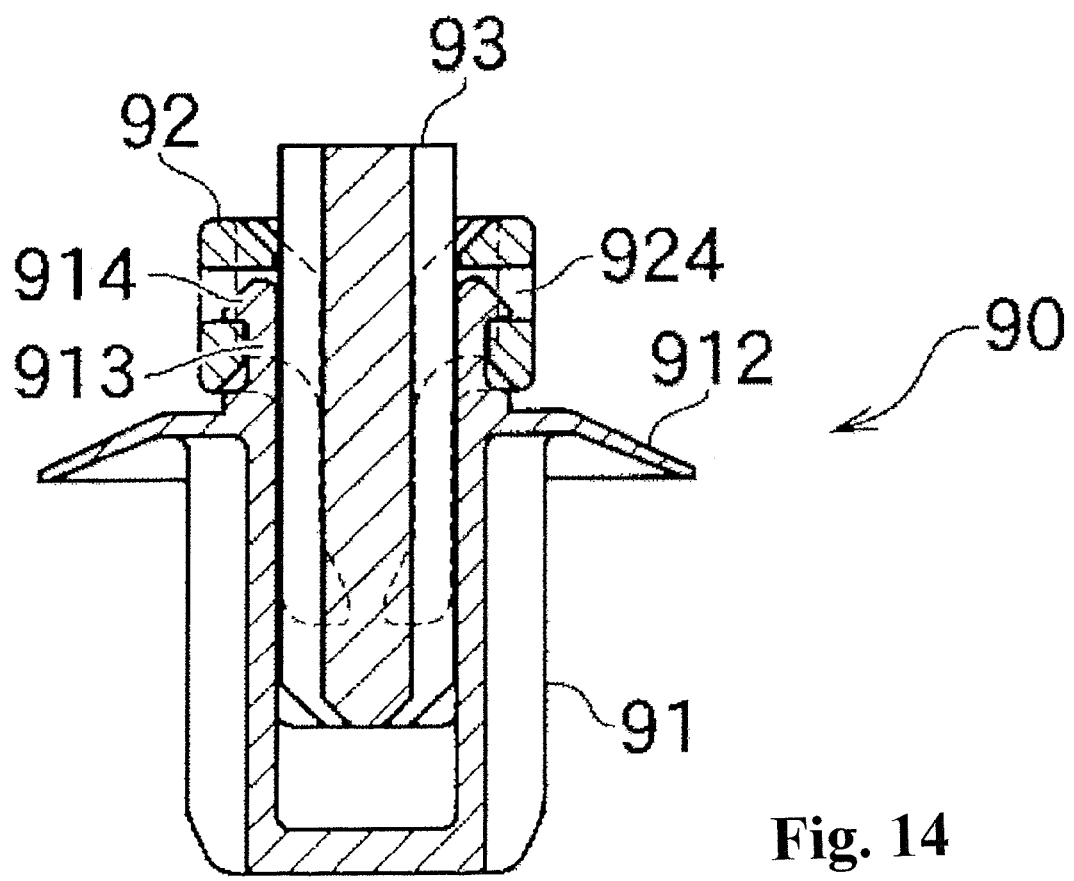
Fig. 14

SHAFT SUPPORT STRUCTURE AND CLIP

FIELD OF TECHNOLOGY

The present invention relates to a shaft support structure and a clip, which have a compact size capable of fixing to an attached member and the like, are made at a low price, and are suited for mass production, and a metal mold for the shaft support structure. The present invention relates to the shaft support structure and the clip, which fit in a flat plate member comprising a window portion, and include a flange portion and a leg portion protruding in a right angle direction from the flange, and the metal mold for the shaft support structure. Moreover, the present invention relates to the shaft support structure and the clip, which can be attached to a member with a shape such as a bumper to a plate-like member (for example, a vehicle body panel) including an opening portion through the clip, and the metal mold for the shaft support structure, so as to simplify a shape of the metal mold as simple as possible.

BACKGROUND ART

FIG. 21 is a perspective view for explaining the clip in a conventional example. In FIG. 21, for example, as described in Japanese Unexamined Patent Publication No. 2004-36725, a clip 2191 comprises at least an annular member holding portion 2192; and an attachment portion 2193 fixing a linear member, a pipe-like member, and an annular member (which is not shown in the figure) such as a covered wire member and the like. Also, in the clip 2191, there are integrally provided a rotating shaft 2194 and a bearing portion 2195 allowing the attachment portion 2193 to turn when the annular member is attached and detached. Also, after the attachment portion 2193 is vertically extended from the rotating shaft 2194, the attachment portion 2193 is folded at a right angle, holds the annular member, and is additionally fixed by a fixture portion 2196 bent at a right angle.

FIG. 22 is a drawing for explaining an example producing a "carabiner" in the conventional example by few metal molds. In FIG. 22, for example, as described in Japanese Examined Patent Application Publication No. H06-74802, the "carabiner" comprises a carabiner main body 2201; a neck portion 2202 connected to the carabiner loop main body 2201; a bulging portion 2203; a leg portion 2204 being freely rotatable to the bulging portion 2203; a through-bore 2205 provided in the leg portion 2204; and a belt attachment body 2206 provided on an upper portion of the through-bore 2205, and they are mutually constituted to be freely rotatable. The carabiner main body 2201 is simultaneously produced by a pair of metal molds 2207, and two pieces of slider metal molds 2208 and 2209. Also, besides the aforementioned Patent Documents, for example, there is such an attachment tool in Japanese Unexamined Patent Publication No. H08-68406.

PRIOR ART DOCUMENT

Patent Document

Patent Document 1: Japanese Unexamined Patent Publication No. 2004-36725
Patent Document 2: Japanese Examined Patent Application Publication No. H06-74802
Patent Document 3: Japanese Unexamined Patent Publication No. H08-68406

SUMMARY OF THE INVENTION

Problems to be Solved by the Invention

In the clip 2191 described in Japanese Unexamined Patent Publication No. 2004-36725, at a time of production, the attachment portion 2193 is bent at a right angle. Also, in the rotating shaft 2194 and the bearing portion 2195, a slider metal mold is required to pull in two directions so as to have a large projected area of the metal mold. Also, in the clip 2191, since the projected area is large, it was difficult to simultaneously produce a plurality of pieces by one metal mold. Also, in the "carabiner" described in Japanese Examined Patent Application Publication No. H06-74802, as indicated by arrows in the figures, the slider metal molds 2208 and 2209 are required to pull out bilaterally, and have disadvantages that a space pulling out the aforementioned metal molds is large, and that the number of the metal molds increases, so that a number of pieces could not be simultaneously produced by one metal mold.

In the attachment tool described in Japanese Unexamined Patent Publication No. H08-68406, since a through-bore is formed in a first member, there is a problem that an attachment hole cannot be water-tightly sealed. As a device to solve the aforementioned problem, there is a possible solution method that the through-bore is a hole with a bottom, or that a claw portion is formed in a cylindrical portion of the first member, and a hole engaging with the claw portion is provided in a second member. However, in a case where the first member is molded by a resin material, in the aforementioned solution method, a convex portion protruding in a direction different from a shaft line direction (a depth direction) of the cylindrical portion, or a caved concave portion is formed in an inside wall of the cylindrical portion of the first member, so that there is a problem that the number of the slider metal molds required for molding an inside of the cylindrical portion increases.

In order to solve the aforementioned problems, an object of the present invention is to provide a shaft support structure, a clip, and a metal mold for the shaft support structure, wherein the projected area of a producing metal mold can be reduced, and a number of pieces can be simultaneously produced by one metal mold. Also, an object of the present invention is to provide a shaft support structure which can be simultaneously produce by a small number of the metal molds, a clip, and a metal mold for the shaft support structure.

Means for Solving the Problems

A shaft support structure of the present invention comprises at least a base body comprising an attachment device fixing an attached member; a bearing portion provided in an end portion of the base body; a swinging shaft axially supported and rotatable inside the bearing portion; and a lid body turning by the swinging shaft, and integrating with the base body.

The lid body in the shaft support structure of the present invention may include a flat thin plate portion comprising a concave portion having a connecting portion connecting to the swinging shaft, and a thickness may alternately differ in a front side and a back side in a length direction of the swinging shaft of the concave portion.

The swinging shaft and the bearing portion of the lid body in the shaft support structure of the present invention may be eccentric in the center of an opening portion.

The shaft support structure of the present invention can be provided in a clip fixing the attached member. The clip comprises the base body in which a holding portion fixing and holding at least one of the attached members, an attachment portion engaging with the attached member, and a retaining portion are molded; and the lid body in which the bearing portion comprising the opening portion integrally extending in one side of the base body, a locking portion molded to be capable of locking in the retaining portion at the other side of the base body, a rotating shaft axially supported and rotatable through the opening portion of the bearing portion, and a planar member covering and holding the holding portion between the rotating shaft and the locking portion, are integrally molded. The base body and the lid body are rotatably lockable, and also relative to a molding metal mold molding the base body and the lid body, a slider metal mold is molded by a metal mold which is rotatable only in one different direction.

The metal mold for the shaft support structure of the present invention comprises at least a fixture metal mold wherein one side relative to a center line in a length direction of the base body, the bearing portion, and the lid body is fixed; a movable metal mold wherein the other side relative to the center line in the length direction of the base body, the bearing portion, and the lid body is movable; and the slider metal mold which enters into the opening portion of the bearing portion, and can pull out in an upward direction and/or a downward direction. The metal mold for the shaft support structure of the present invention molds the lid body at a position of 180 degrees or 90 degrees relative to the base body.

Effect of the Invention

According to the present invention, since the shaft support structure of the clip has been devised, the metal mold can be divided to both sides based on a dividing line in a state wherein the lid body is closed, so that a projected area of a producing metal mold can be reduced, and also the shaft support structure, the clip, and the metal mold for the shaft support structure can be produced at a moderate price.

According to the present invention, since the shaft support structure of the clip has been devised, the metal mold in the state wherein the lid body is closed is allowed, so that a number of pieces can be made by one metal mold so as to allow mass production.

According to the present invention, both-end side surfaces of the clip can be one surface (one surface—there is no protruding portion, and the surface uniformly aligns) so as to be capable of producing the metal mold at a moderate price.

According to the present invention, since structures of a flange portion, a body portion, a link portion, and the rotating shaft have been devised, not only an entire size of the metal mold can be reduced, but also by adeptly using the number and the shape of the fixture metal mold, the movable metal mold, and the slider metal mold, even in a case of a complicated shape, the clip can be produced in few operations.

According to the present invention, by increasing the shape and the number of the slider, the clip can be simultaneously produced so as to allow mass production.

BRIEF DESCRIPTION OF THE DRAWINGS

FIGS. 3(A) to 3(C) are the embodiment of the present invention, wherein FIG. 3(A) is a front view; FIG. 3(B) is a plan view; and FIG. 3(C) is a side view, of a state wherein the clip is open.

FIGS. 12(A) to 12(C) are assembly drawings when the clip, a plate-like member, and the bumper are attached in the clip of the present invention.

FIG. 13 is a cross-sectional view taken along a line A to A in FIG. 12(B).

FIG. 14 is a cross-sectional view taken along a line B to B in FIG. 12(A).

EMBODIMENTS FOR CARRYING OUT THE INVENTION

Figure 1:
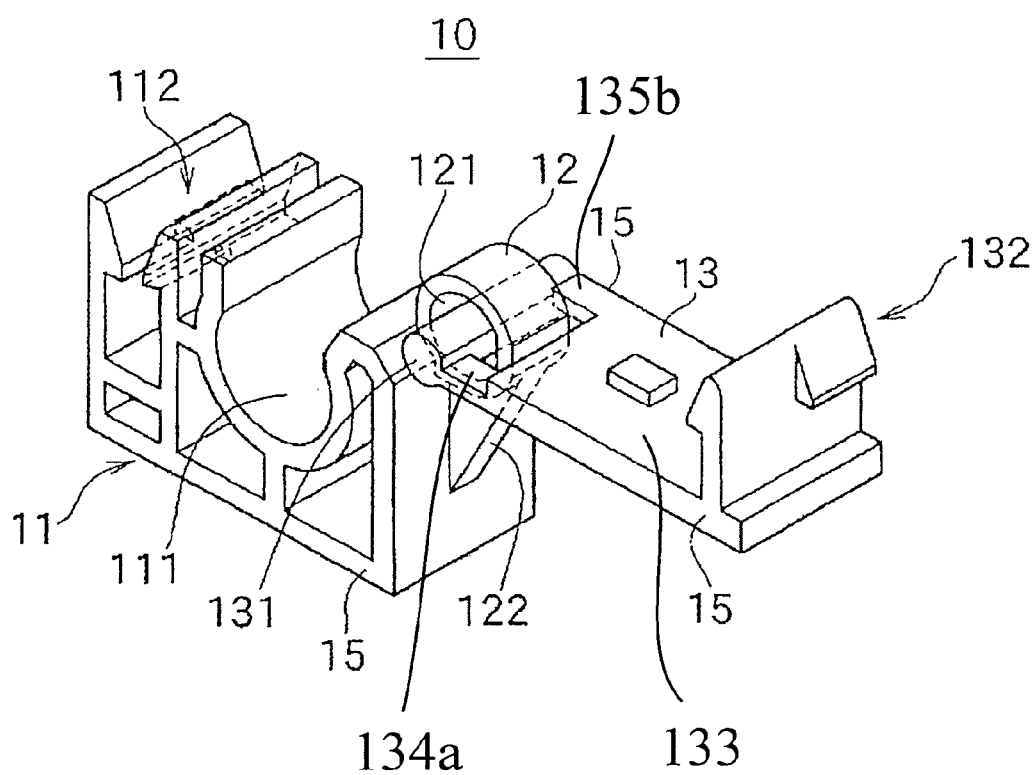
FIG. 1 is a perspective view of a clip which is an embodiment of the present invention, and is a drawing for explaining a state wherein a locking lid is open.

A shaft support structure of the present invention comprises at least a base body comprising an attachment device fixing an attached member; a bearing portion provided in an end portion of the base body; a swinging shaft provided in an inside of the bearing portion; and a lid body turning and integrating with the base body. The shaft support structure is provided in a clip attaching the attached member, or a clip, and can fix one piece or a plurality of pieces of at least one kind or a plurality of kinds of, for example, a bumper, a linear member, a pipe-like member, and a covered wire member (hereinafter, simply described as the linear member and the like). The attached member is not limited to the bumper or the linear member, and one portion of a deformed portion such as a curved line or a key form can be fastened.

In the attached member, the base body, the bearing portion, and the lid body are made of synthetic resin or metal (for example, aluminum alloy and the like), and are integrally molded by a metal mold. In the base body, for example, the lid body is integrally molded on one end to be rotatable. In the base body, there are integrally molded a holding portion fixing and holding at least one of the aforementioned respective members; an attachment portion attached to the attached member; and a retaining portion. In the holding portion, there can be provided a concavity and a convexity on a contact surface, which can fix when the attached member is clipped. For example, the attached member is a body of a vehicle body and the like.

The bearing portion integrally extends in one end of the base body, and comprises an opening portion in which a rotating shaft enters to be freely rotatable. In the lid body, there are integrally molded a locking portion which can lock in the base body on the other side; the rotating shaft being freely rotatable at the bearing portion comprising the opening portion on one side; and a planar member covering the holding portion between the locking portion and the rotating shaft. The rotating shaft is simultaneously molded by the metal mold so as to be rotatable inside the opening portion of the bearing portion integrally extended on one side of the base body. The lid body of the present invention is constituted as above, and even if the lid body has any angle relative to the base body, the lid body can rotate, and locks in the retaining portion on the other side so as to be capable of fixing the attached member.

Also, structures of the base body, the bearing portion, and the lid body are molded by the metal mold in which a molding metal mold, which mold the base body and the lid body with the rotating shaft, and a slider metal mold are movable only in one direction. Also, the slider metal mold has a top surface with a C shape, and in order to allow the rotating shaft to rotate inside the bearing portion, the slider metal mold is divided above and below so as to alternately differ in the inside of the bearing portion. Shapes and the structures of the base body, the bearing portion, and the lid body of the present invention allow for a structure in which the molding metal mold (a movable metal mold) is only pulled in one direction of a dividing line, and also in which a slider is only pulled in one direction of a lower side, so that not only an entire size of the metal mold can be reduced, but also a plurality of pieces of molded articles can be simultaneously produced by one metal mold.

The aforementioned shaft support structure can have one surface (one surface—there is no protruding portion, and the surface uniformly aligns) in which both-end side surfaces of the base body, the bearing portion, and the lid body have a linear shape, so that there are no concavity and no convexity on the both-end side surfaces, and the metal mold can be reduced so as to be capable of simultaneously molding a number of pieces of the molded articles.

The lid body of the present invention comprises a flat thin plate portion, and a connecting portion connecting to the swinging shaft. The thin plate portion comprises a concave portion along a length direction of the swinging shaft, and a thickness alternately differs in a front side and a back side of the swinging shaft of the concave portion. The swinging shaft can be simultaneously molded by the metal mold in which the thickness of the proximity of the swinging shaft of the lid body alternately differs.

In the shaft support structure of the present invention, the swinging shaft of the lid body can be in the center of the opening portion in the bearing portion, or the swinging shaft can be eccentric at the bearing portion. Specifically, the swinging shaft can be not only in the center inside the bearing portion, but also can freely move, for example, in an inside of an oval shape.

The clip of the present invention inserts the attached member, which includes the locking portion protruding in a vertical direction relative to the flat plate member, into the flat plate member including a window portion so as to be capable of fixing. For example, the attached member is like the bumper. However, a shape thereof is not necessarily limited to the same shape as embodiments, and may be variously modified. In the clip, there are molded a flange portion including a leg portion (the base body) fitting into the window portion of the flat plate member; a body portion (the lid body) including column-like portions fitting into the leg portion (the base body), and connecting holes locking in connecting claws protruding from the leg portion; a vertical link portion comprising an opening portion; and a horizontal link portion comprising a rotating shaft which can turn the body portion (the lid body). Also, the leg portion (the base body) comprises locking claws on both side portions, which lock when the leg portion fits into the window portion.

The vertical link portion comprises the opening portion integrally extending from the flange portion. The rotating shaft is supported by axes on the horizontal link portion to be capable of turning the body portion. The body portion rotates the rotating shaft in the center, and enters the column-like portions, molded in an inside, into an inside of the leg portion. Also, the connecting claws molded in the leg portion are fitted into the connecting holes molded in the body portion. The rotating shaft is simultaneously molded by the metal mold in such a way as to be capable of rotating to be freely rotatable inside the opening portion of the link portion integrally extended in the body portion.

Also, structures of the leg portion, the flange portion, the vertical link portion, the horizontal link portion, and the body portion are molded by the molding metal mold and a plurality of the slider metal molds for molding. Also, the shapes and the structures of the flange portion, the vertical link portion, the horizontal link portion, and the body portion including the leg portion of the present invention allow for a structure in which the molding metal mold (the movable metal mold) is only pulled in one direction of the dividing line, and also in which a plurality of the slider metal molds is only pulled in a downward direction, so that not only the entire size of the metal mold can be reduced, but also a number of pieces of the molded articles can be simultaneously produced by few metal molds.

The aforementioned metal mold for producing the clip can be produced by the fixture metal mold, the movable metal mold, and the slider metal mold. In the fixture metal mold, there is fixed one side relative to a center line in a length direction of the base body, the bearing portion, and the lid body, and at last, the molded articles are pulled out. In the movable metal mold, the other side relative to the center line in the length direction of the base body, the bearing portion, and the lid body is movable, and by pulling out the mold, the other side relative to the center line is exposed. The slider metal mold enters into the opening portion of the bearing portion, and by pulling out the slider metal mold while sliding the slider metal mold in an upward direction or the downward direction, a cavity can be internally molded.

The metal mold for producing the clip can be produced by the fixture metal mold, the movable metal mold, and a plurality of pieces of upper and lower slider metal molds. In the fixture metal mold, there is fixed one side relative to a center line in a length direction of the flange portion including the leg portion; the body portion including the column-like portions and the connecting holes locking in the connecting claws; the vertical link portion including the opening portion; and the horizontal link portion which can turn the body portion, and at last, the molded articles are pulled out. In the movable metal mold, the other side relative to the center line in the length direction of the flange portion, the body portion, the vertical link portion, and the horizontal link portion is movable, and by pulling out the mold, the other side relative to the center line is exposed.

The slider metal mold comprises at least, for example, a first slider metal mold pulling out upwardly; a second slider metal mold; a third slider metal mold; and a fourth slider metal mold pulling out downwardly. The first slider metal mold enters into an approximately central portion of the leg portion, and is pulled out upwardly. The second slider metal mold enters into an approximately central portion of the body portion, and is pulled out upwardly. The third slider metal mold enters into the hinge portion, and is pulled out upwardly. The fourth slider metal mold enters into a central portion of the body portion, and is pulled out downwardly. The metal mold for producing the clip of the present invention can produce the clip at once in few operations by adeptly molding shapes of the fixture metal mold, the movable metal mold, and the first slider metal mold to the fourth slider metal mold. Detailed shapes of the respective metal molds deform according to the shapes of the leg portion, the body portion, and the link portion.

The metal mold for the shaft support structure of the present invention comprises at least the fixture metal mold wherein one side relative to the center line in the length direction of the base body, the bearing portion, and the lid body is fixed; the movable metal mold wherein the other side relative to the center line in the length direction of the base body, the bearing portion, and the lid body is movable; and the slider metal mold which enters into the opening portion of the bearing portion, and can be pulled out in the upward direction and/or the downward direction. The fixture metal mold, the movable metal mold, and the slider metal mold can mold the lid body at a position of 90 degrees in addition to at a position of 180 degrees relative to the base body.

First Embodiment

Figure 2:
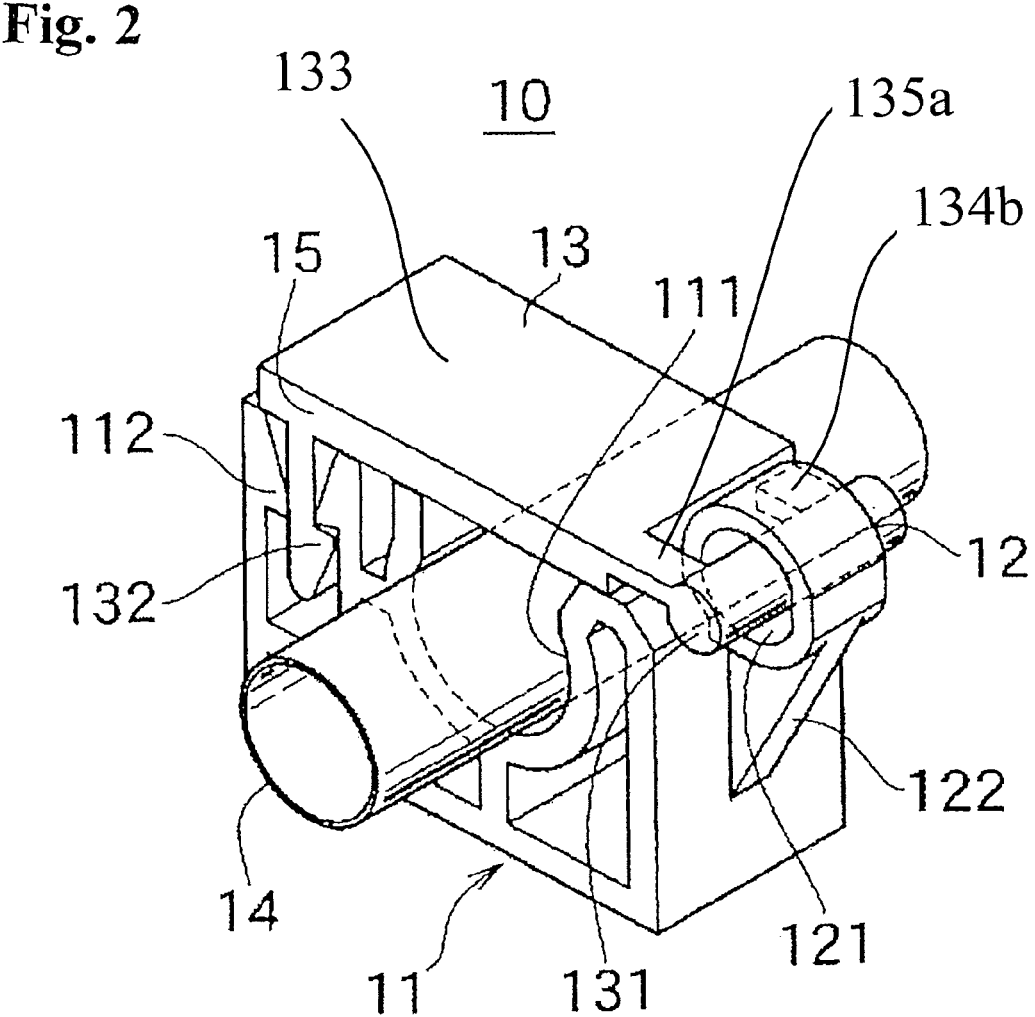
FIG. 2 is a perspective view of the clip which is the embodiment of the present invention, and is a drawing for explaining a state wherein the locking lid is closed.
Figure 3C:
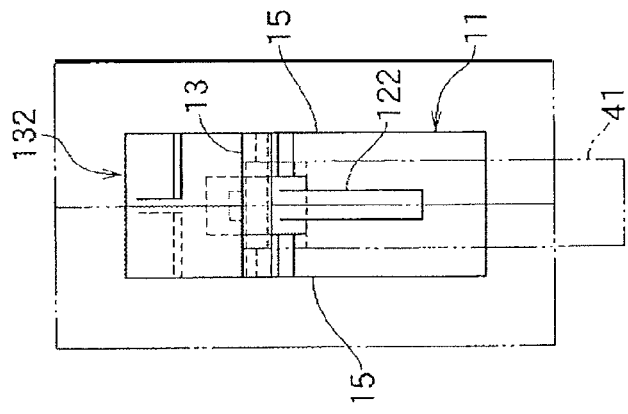
Figure 3B:
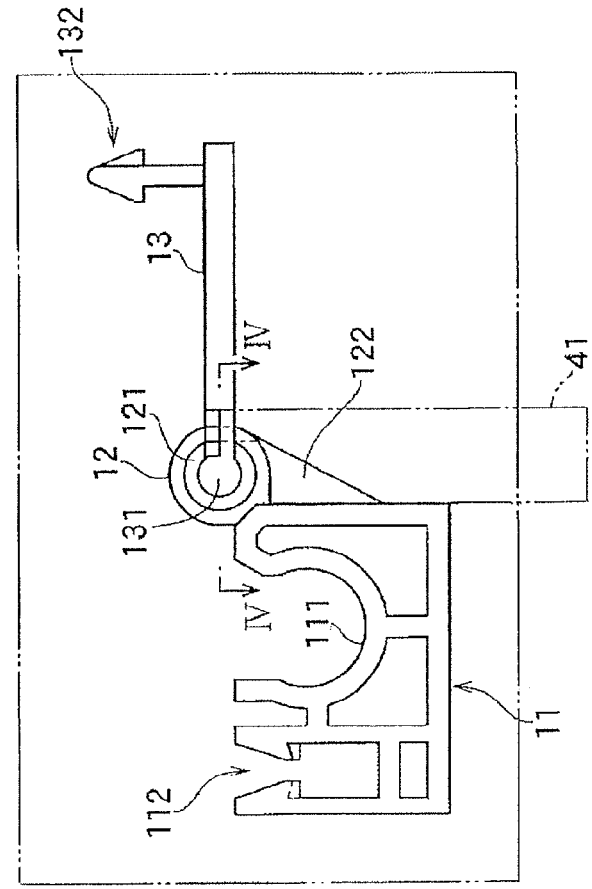
Figure 3A:
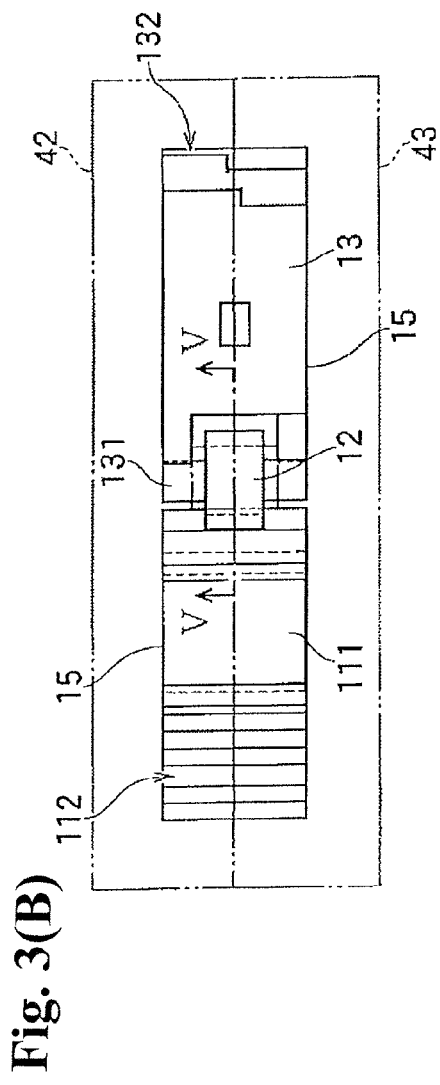

FIG. 1 is a perspective view of a clip which is an embodiment of the present invention, and is a drawing for explaining a state wherein a locking lid is open. FIG. 2 is a perspective view of the clip which is the embodiment of the present invention, and is a drawing for explaining a state wherein the locking lid is closed. FIGS. 3(A) to 3(C) are the embodiment of the present invention, wherein FIG. 3(A) is a front view; FIG. 3(B) is a plan view; and FIG. 3(C) is a side view, of a state wherein the clip is open.

In FIGS. 1 to 3(C), a clip 10 can fix a linear member, a pipe-like member, and a covered wire member (hereinafter, simply described as the linear member and the like) 14, and also can attach to, for example, an inside of a body such as a vehicle and the like. As for the clip 10, in the figures, a portion attached to the body and the like is omitted. In the clip 10, a base body 11; a bearing portion 12; and a locking lid 13 are simultaneously and integrally molded by the metal mold, and also are integrated to be mutually inseparable.

In one end of the base body 11, the locking lid 13 is integrally molded to be rotatable. In the base body 11, there are integrally molded a holding portion 111 fixing and holding the aforementioned linear member and the like; an attachment portion (which is not shown in the figures) attaching to, for example, an attachment object such as the body of a car and the like; and a retaining portion 112.

The bearing portion 12 integrally extends in one end of the base body 11, and comprises an opening portion 121 in which a rotating shaft 131 enters rotatably. Also, in the bearing portion 12, as necessary, a support portion 122 protrudes from the base body 11 so as to be capable of holding a strength. For example, as described in Japanese Examined Patent Application Publication No. H06-74802, productions of the bearing portion 12 and the rotating shaft 131 can be integrally molded by a plurality of the metal molds.

The locking lid 13 includes a flat thin plate portion 133, and the flat thin plate portion 133 has concave portions 134a and 134b. The concave portions 134a and 134b are respectively formed at connecting portions 135a and 135b connecting to the swinging shaft 131. In the locking lid 13, there is integrally molded a planar member covering the holding portion 111 between a locking portion 132 being lockable in the retaining portion 112 of the base body 11 on the other side, and the rotating shaft 131 being freely rotatable inside the bearing portion 12 comprising the opening portion 121 on one side. The rotating shaft 131 is simultaneously molded by the metal mold so as to be capable of rotating to be freely rotatable inside the opening portion 121 of the bearing portion 12 integrally extended on one side of the base body 11. The metal mold will be explained with the following FIG. 4 and FIG. 5.

The base body 11; the bearing portion 12; and the locking lid 13 are molded in such a way that both side surfaces become one surface (one surface—there is no protruding portion, and the surface uniformly aligns). Also, the base body 11; the bearing portion 12; the retaining portion 112 of the locking lid 13; and the locking portion 132 protrude in the same direction, or in an alternately different direction relative to the aforementioned both side surfaces so as to have a shape in which the metal mold can be easily pulled.

Figure 4:
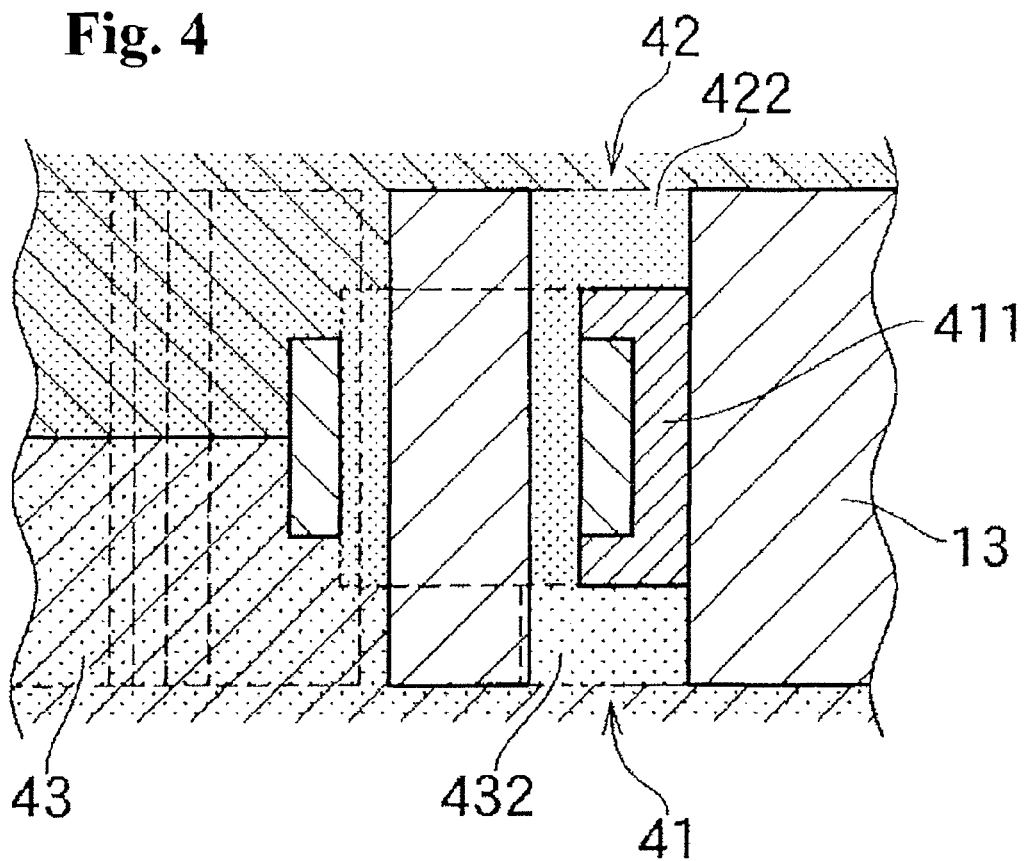
FIG. 4 is a drawing for explaining a metal mold of the present invention, and is the drawing for explaining a top portion of a slider metal mold; a fixture metal mold; and a movable metal mold.
Figure 5:
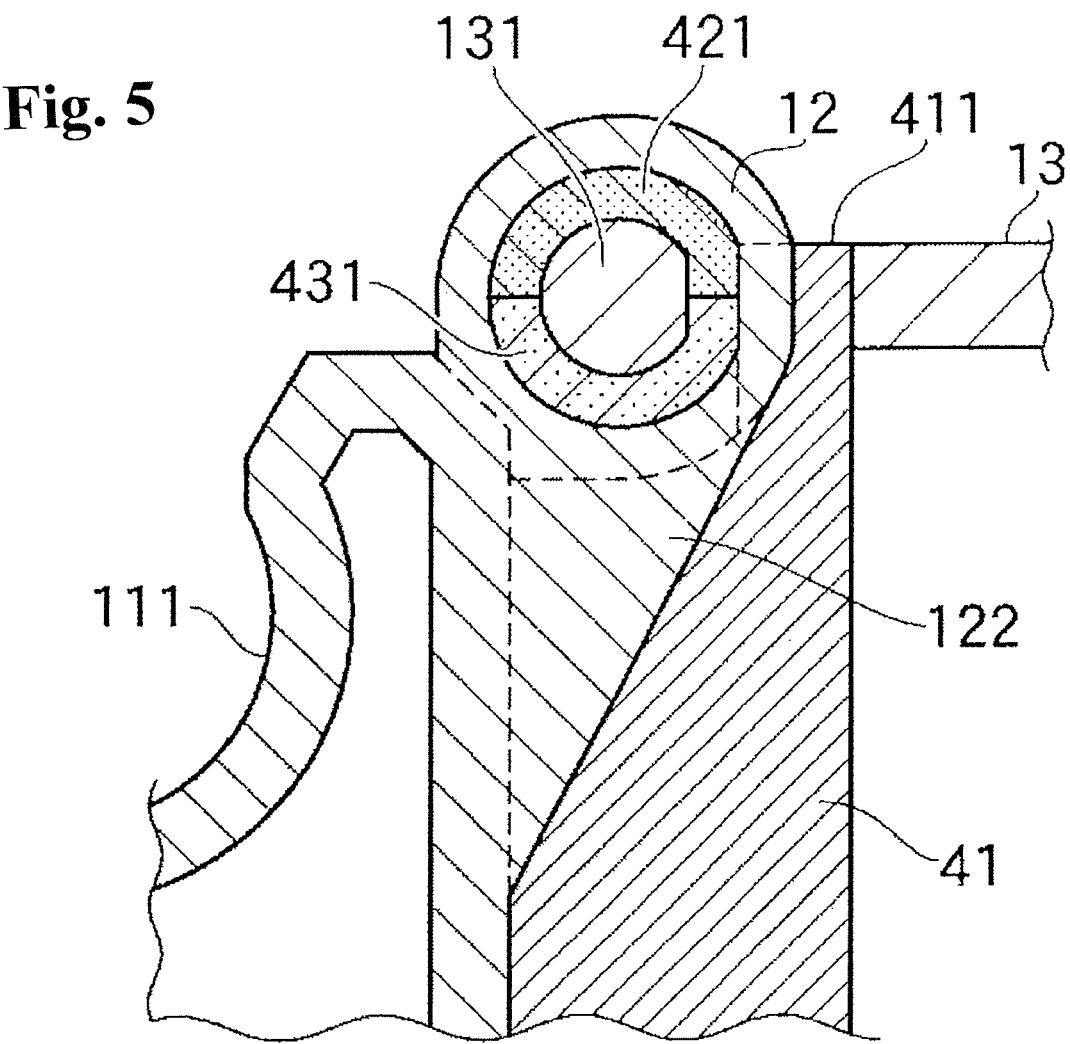
FIG. 5 is an enlarged view of the proximity of a rotating shaft and a bearing of the present invention, and is a drawing for explaining a slider.

FIG. 4 is a drawing for explaining the metal mold of the present invention, and is the drawing for explaining a top portion 411 of a slider metal mold; a fixture metal mold; and a movable metal mold. FIG. 5 is an enlarged view of the proximity of a rotating shaft and a bearing of the present invention, and is the drawing for explaining a slider. In FIG. 4 and FIG. 5, structures of the base body 11, the bearing portion 12, and the locking lid 13 are molded from the metal mold in which a fixture molding metal mold 42 and a movable metal mold 43, which mold the base body 11 and the locking lid 13 with the rotating shaft 131, and a slider metal mold 41 are movable only in one direction.

As shown in FIG. 4, the slider metal mold 41 has the top surface 411 with a C shape, and molds one portion of the bearing portion 12, the support portion 122, and the base body 11. Also, after the molding, the slider metal mold 41 is pulled downwardly. The clip 10 is molded by the metal mold 42 and the metal mold 43, which are divided in an up-and-down direction in FIG. 3(B) and FIG. 4; and the slider metal mold 41 moving downwardly in FIGS. 3(A) and 3(C), and FIG. 5. Also, the rotating shaft 131 is molded in the fixture metal mold 42 in order to be rotatable inside the bearing portion 12. Also, the rotating shaft 131 enters into the bearing portion 12, and is molded by an upper-portion intra-shaft metal mold 421 which covers an upper portion of the rotating shaft 131 and has a semicircular shape of a cross-sectional surface.

The movable metal mold 43 molds a shape of the clip 10, and also covers a lower portion of the rotating shaft 131. The movable metal mold 43 comprises a lower-portion intra-shaft metal mold 431 which enters into the bearing portion 12 and has the semicircular shape of the cross-sectional surface. The upper-portion intra-shaft metal mold 421 is connected to an upper-portion metal mold 422, and has a shape such that one portion is exposed on an upper side of the locking lid 13. Also, the lower-portion intra-shaft metal mold 431 is connected to a lower-portion metal mold 432, and also has a shape such that one portion is exposed on a lower side of the locking lid 13. The upper-portion intra-shaft metal mold 421 and the lower-portion intra-shaft metal mold 431 mutually contact only by ridge line portions, so that the upper-portion intra-shaft metal mold 421 and the lower-portion intra-shaft metal mold 431 can be simultaneously produced by the aforementioned three pieces of the metal molds in such a way that the rotating shaft 131 can turn inside the bearing portion 12.

The locking lid 13 in the clip of the present invention is structured as above, and even if the locking lid 13 has any angle relative to the base body 11, the locking lid 13 can rotate, and locks in the retaining portion 112 on the other side so as to be capable of fixing the linear member 14 and the like (see FIG. 2). The structures of the base body 11, the bearing portion 12, and the locking lid 13 of the present invention allow for a structure in which the molding metal molds 42 and 43 are only pulled in one direction of a dividing line, and also in which the slider metal mold 41 is only pulled in one direction of the lower side, so that not only the entire size of the metal mold can be reduced, but also a plurality of pieces of molded articles can be simultaneously produced by one metal mold.

Figure 6:
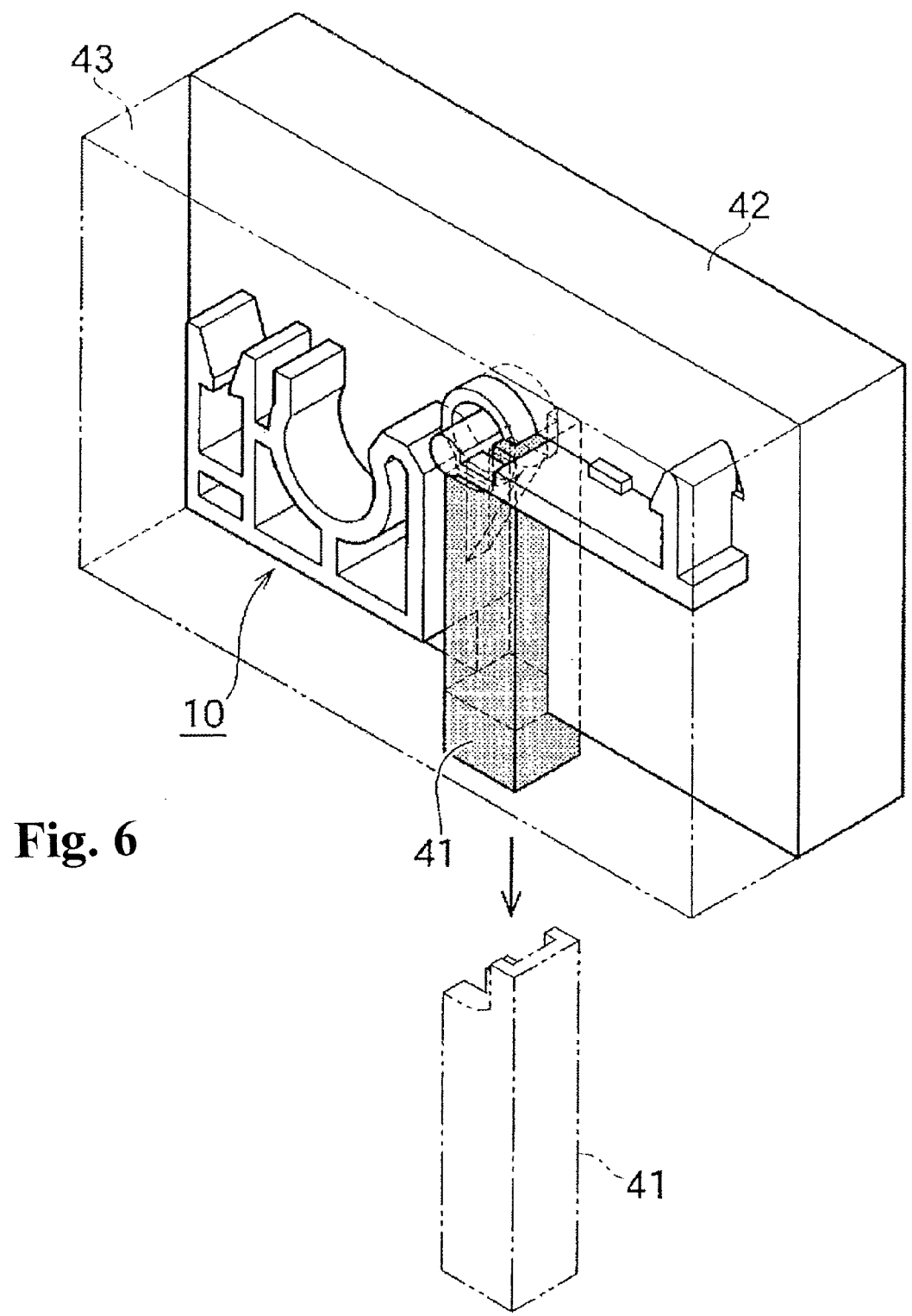
FIG. 6 is a drawing in which the clip is molded inside the metal mold of the present invention, and is the drawing for explaining a state wherein the slider metal mold is pulled from the fixture metal mold and the movable metal mold.
Figure 7:
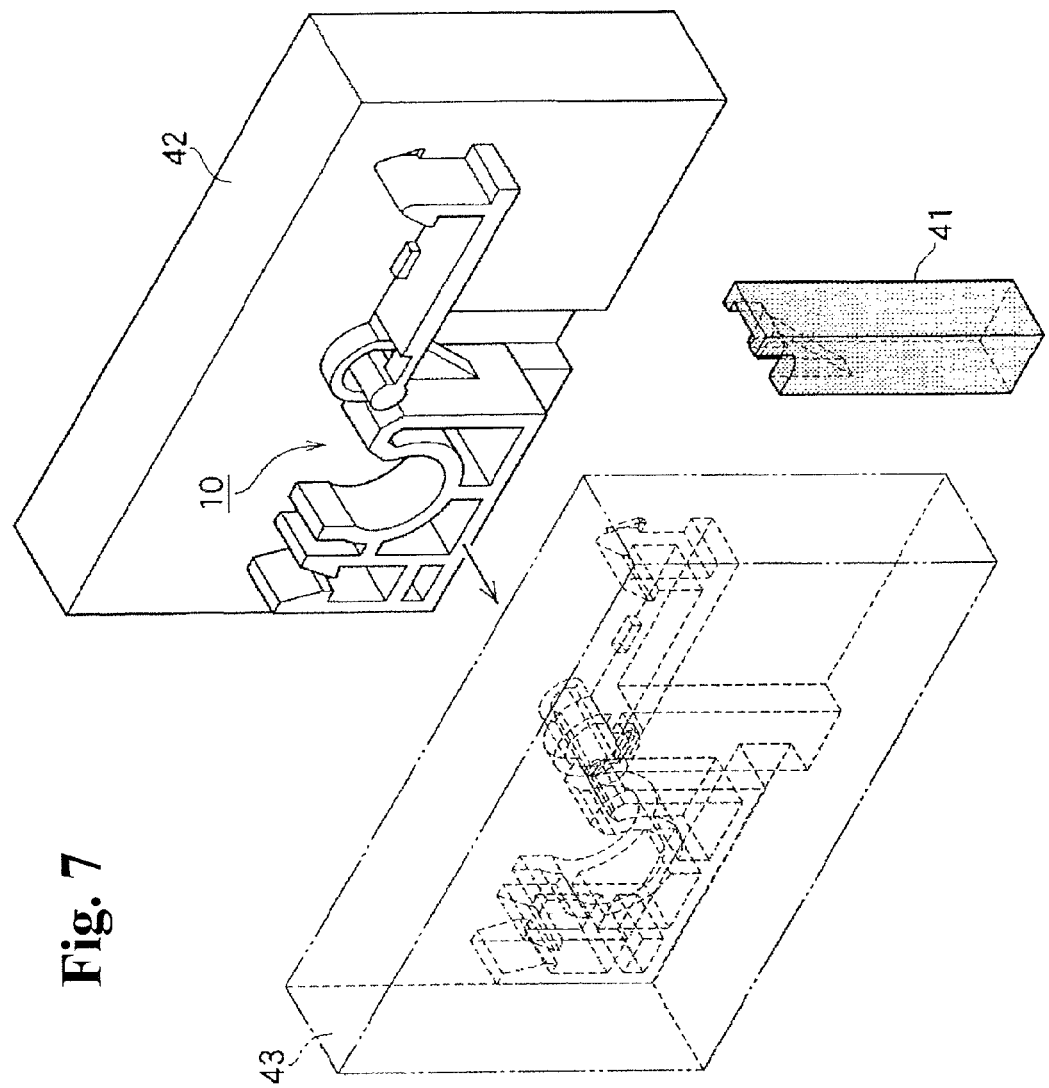
FIG. 7 is a drawing in which the clip is molded inside the metal mold of the present invention, and is the drawing for explaining a state wherein the movable metal mold is pulled from the fixture metal mold.
Figure 8:
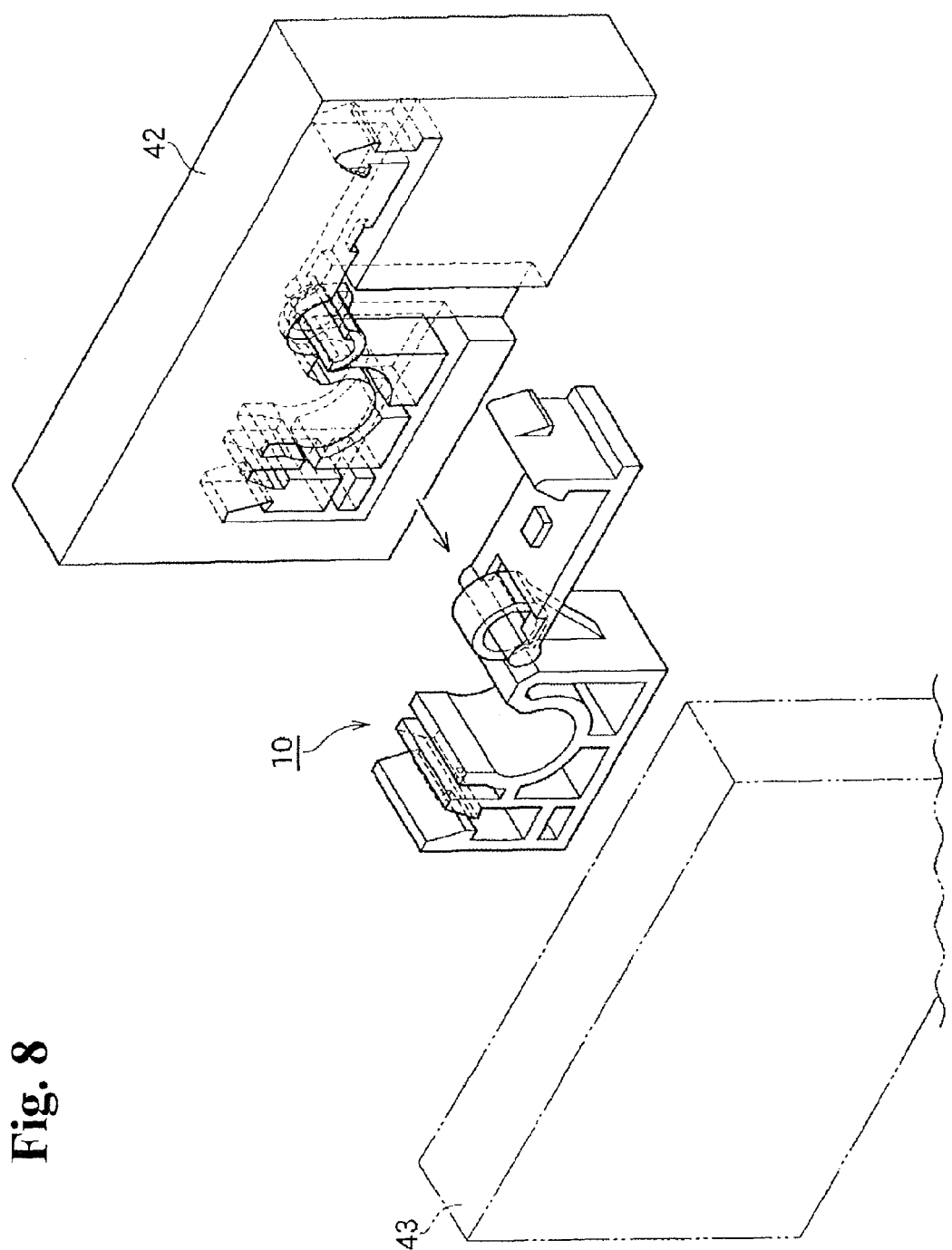
FIG. 8 is a drawing for explaining a state wherein the clip is pulled from the fixture metal mold of the present invention.

FIG. 6 is a drawing in which the clip is molded inside the metal molds of the present invention, and is the drawing for explaining a state wherein the slider metal mold is pulled from the fixture metal mold and the movable metal mold. FIG. 7 is a drawing in which the clip is molded inside the metal mold of the present invention, and is the drawing for explaining a state wherein the movable metal mold is pulled from the fixture metal mold. FIG. 8 is a drawing for explaining a state wherein the clip is pulled from the fixture metal mold of the present invention. In FIGS. 6 to 8, the clip 10 is produced by the metal mold comprising the fixture metal mold 42; the movable metal mold 43; and the slider metal mold 41. After synthetic resin or metal injected into the aforementioned respective metal molds cools down, each metal mold is pulled in the following order.

At first, the slider metal mold 41 is pulled out downwardly. Next, the movable metal mold 43 is pulled. In that state, the clip 10 comes to a state wherein one portion remains in the fixture metal mold 42. Then, as shown in FIG. 8, the clip 10 is pulled out of the fixture metal mold 42 so as to become a merchandise.

Second Embodiment

Figure 9:
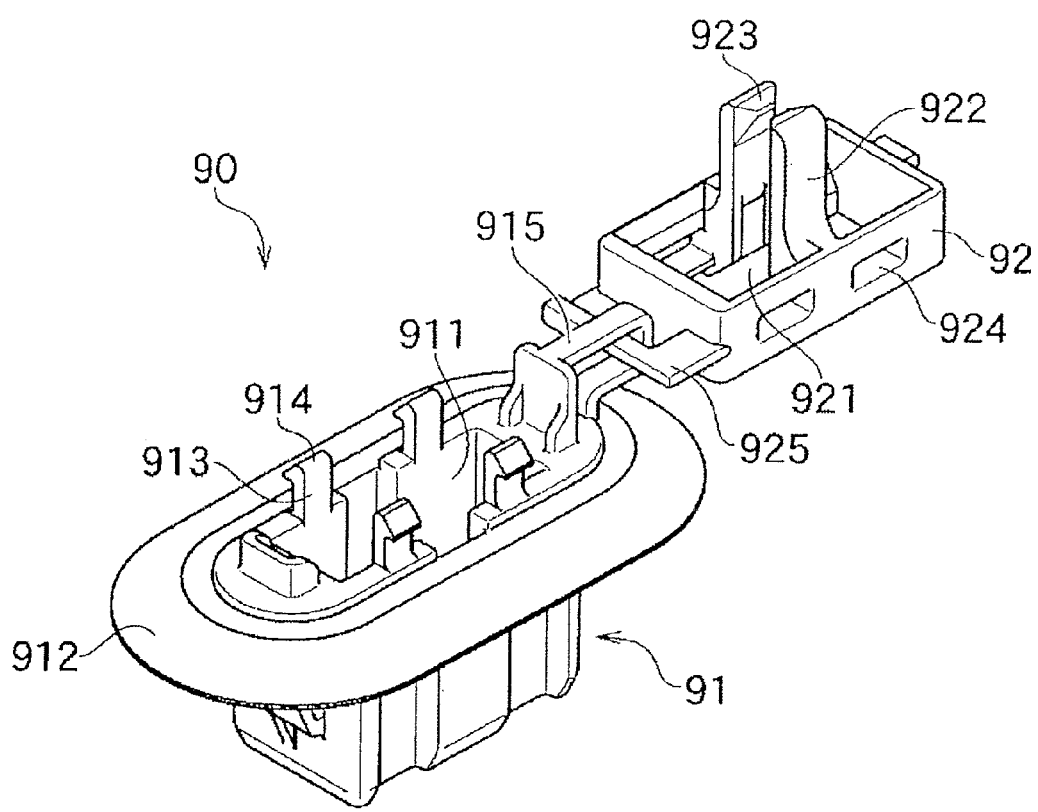
FIG. 9 is a perspective view for explaining the clip with a different shape which is a second embodiment of the present invention.
Figure 10:
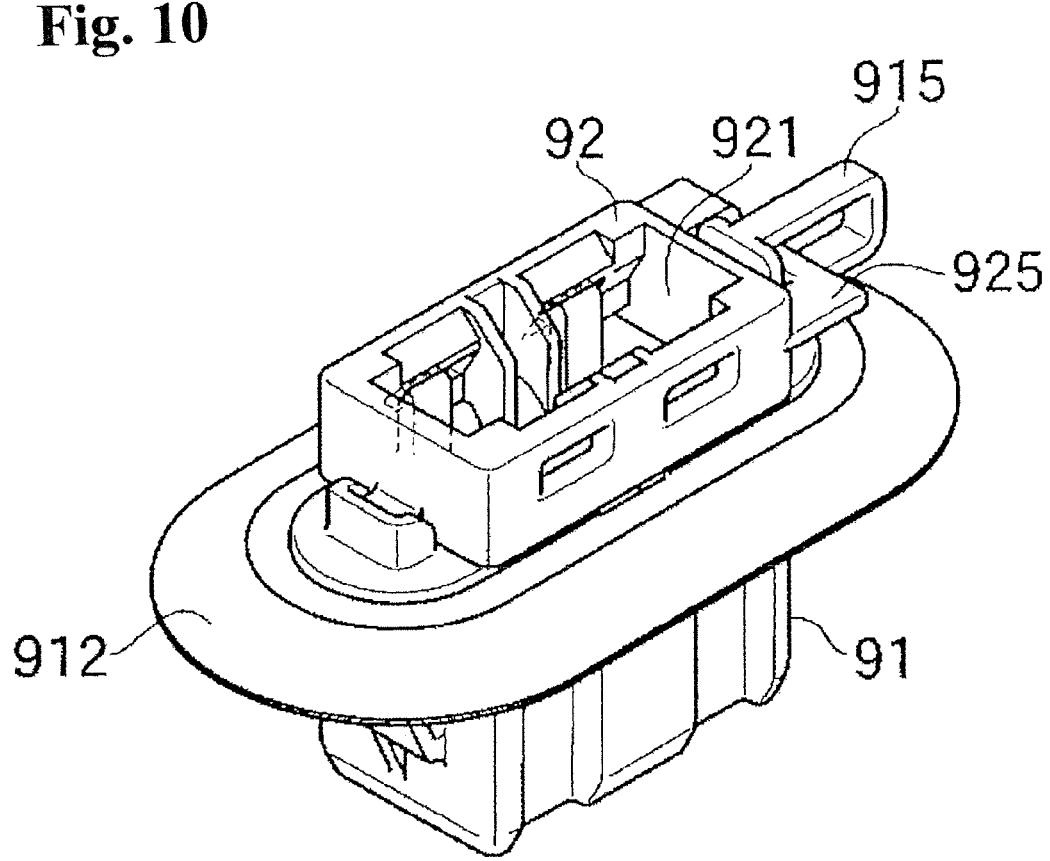
FIG. 10 is a drawing for explaining a state wherein a leg portion and a body portion are mutually fitted in the clip of the second embodiment of the present invention.

FIG. 9 is a perspective view for explaining the clip with a different shape which is a second embodiment of the present invention. FIG. 10 is a drawing for explaining a state wherein a leg portion and a body portion are mutually fitted in the clip of the second embodiment of the present invention. In FIG. 9 and FIG. 10, a clip 90 of the second embodiment comprises at least a leg portion 91 and a body portion 92. The leg portion 91 comprises at least an approximately ring-like flange portion 912 including a housing hole 911 in the inside, and formed in the upper portion; four pieces of column-like portions 913; connecting claws 914 molded in end portions of the column-like portions 913, and mutually facing outwardly; and a vertical link portion 915 comprising an annular portion molded by protruding from an end portion of the flange portion 912.

The body portion 92 comprises at least a through-bore 921 including a hole passing through; two pieces of column-like portions 922 mutually facing in an approximately central portion; fixture claws 923 molded in ends of the column-like portions 922, and projected by mutually facing in the same direction; four pieces of connecting holes 924 molded in side portions of the body portion 92, and engaging with the connecting claws 914 molded in the leg portion 91; and a horizontal link portion 925 molded in a vertical direction with an annular shape at one end of the leg portion 91, entering into an opening portion of the vertical link portion 915, and coming to a turning shaft when the body portion 92 is fitted into the leg portion 91.

Figure 11:
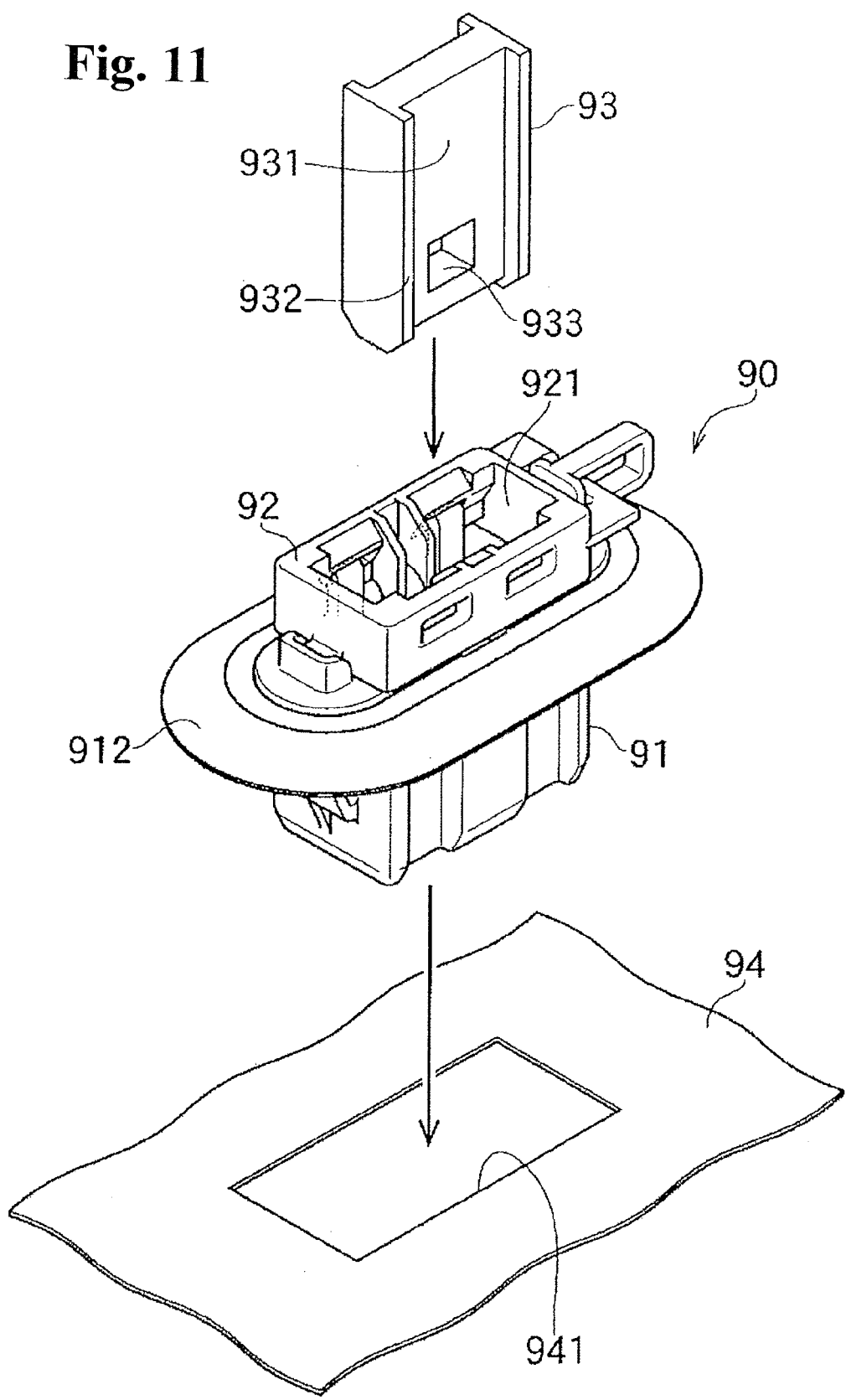
FIG. 11 is a perspective view for explaining a state before a bumper and a vehicle body panel are attached using the clip of the present invention.
Figure 15:
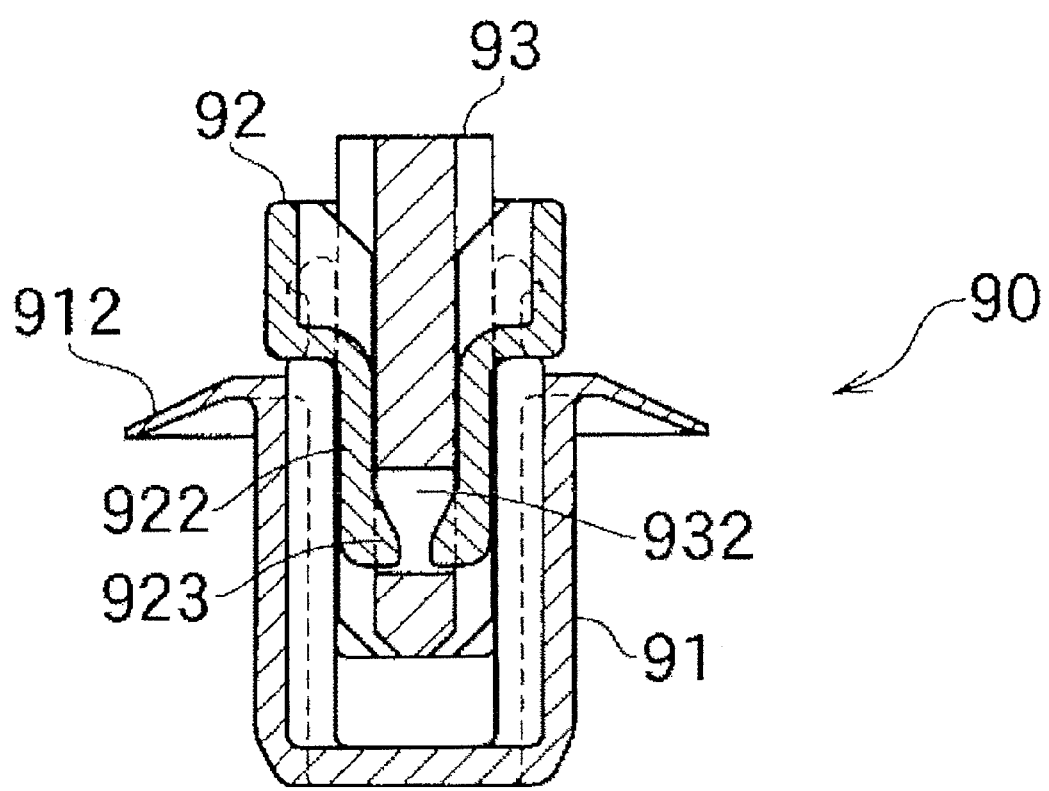
FIG. 15 is a cross-sectional view taken along a line C to C in FIG. 12(A).

FIG. 11 is a perspective view for explaining a state before the bumper and a vehicle body panel are attached using the clip of the present invention. FIGS. 12(A) to 12(C) are assembly drawings when the clip, a plate-like member, and the bumper are attached in the clip of the present invention. FIG. 13 is a cross-sectional view taken along a line A to A in FIG. 12(B); FIG. 14 is a cross-sectional view taken along a line B to B in FIG. 12(A); and FIG. 15 is a cross-sectional view taken along a line C to C in FIG. 12(A).

In FIG. 11, a bumper 93 comprises at least a central concave portion 931 in which a concave portion is molded in the center; side-portion protruding pieces 932 protruding on both sides of the central concave portion 931; and a locking hole 933 provided in a downward direction of the central concave portion 931. A vehicle body panel 94 comprises an attachment hole 941 in a central portion. The leg portion 91 and the body portion 92 are fixed by an engagement between the connecting claws 914 and the connecting holes 924 (see FIG. 14). In that state, the clip 90 is fitted and fixed into an inside of the attachment hole 941 of the vehicle body panel 94.

Elastic attachment portions 916 deform due to cavities 917, so that after the clip 90 shown in FIG. 11 has passed through the attachment hole 941, the clip 90 is fixed (see FIG. 13). Next, in the bumper 93, the central concave portion 931 and the side-portion protruding pieces 932 enter into the housing hole 911 of the leg portion 91, and the through-bore 921 of the body portion 92. The locking hole 933 of the bumper 93 and the fixture claws 923 of the body portion 92 mutually engage so as to be connected (see FIG. 15). FIG. 13 to FIG. 15 are cross-sectional views in order to understand an engagement state of the leg portion 91, the body portion 92, and the bumper 93.

Figure 16B:
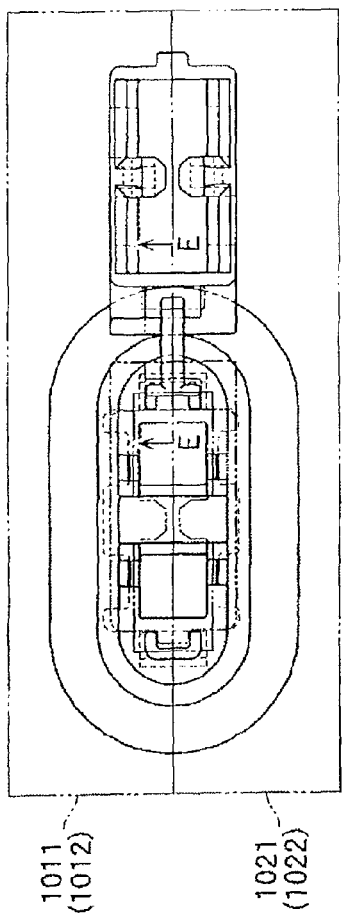
FIGS. 16(A) to 16(C) are drawings for explaining the fixture metal mold, the movable metal mold, and the slider metal mold for molding the clip of the present invention.
Figure 16A:
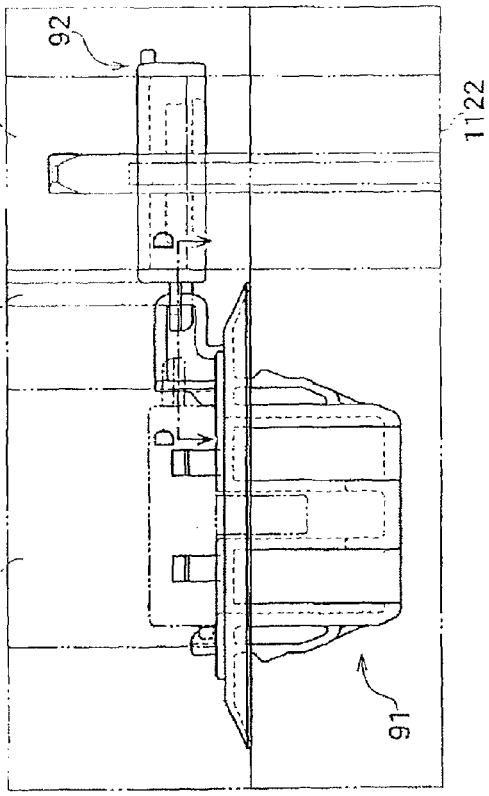
Figure 16C:
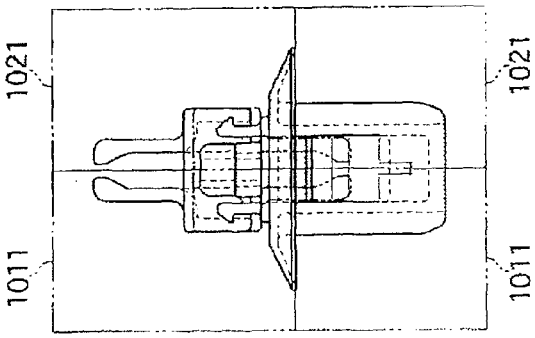
Figure 17:
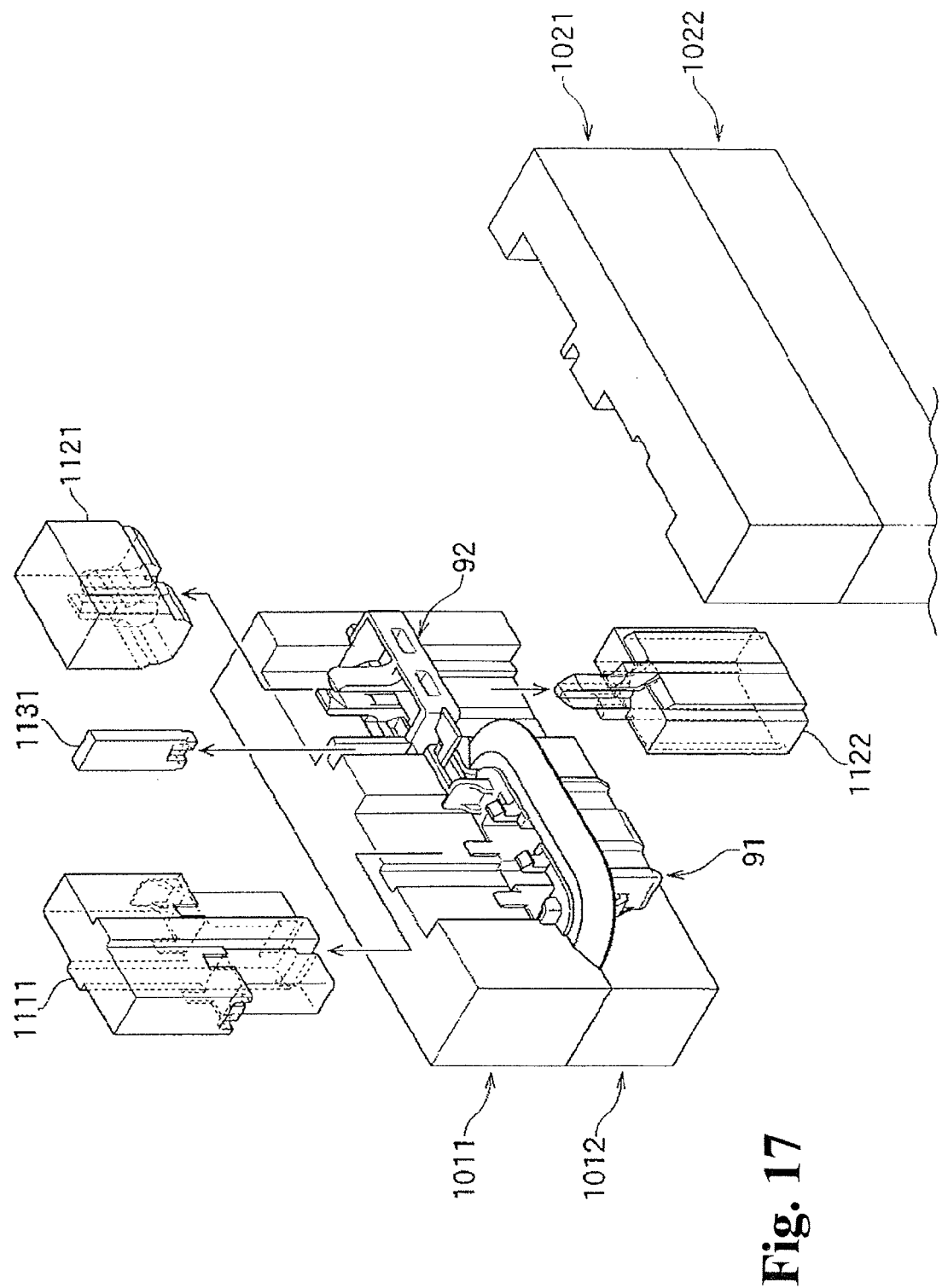
FIG. 17 is a perspective view for explaining the fixture metal mold, the movable metal mold, and the slider metal mold for molding the clip of the present invention.
Figure 18:
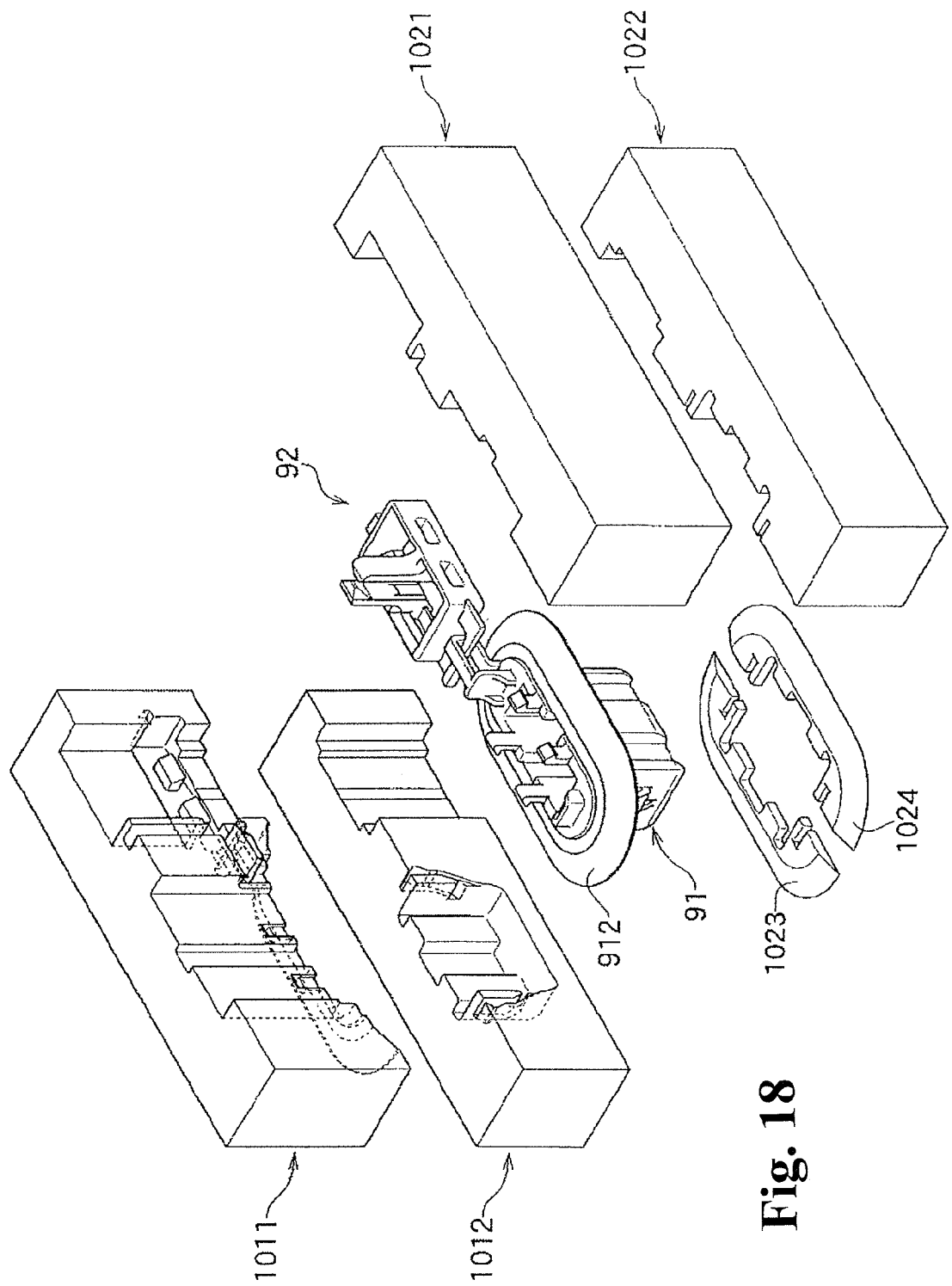
FIG. 18 is an exploded perspective view showing production procedures of the fixture metal mold and the movable metal mold for molding the clip of the present invention.

FIGS. 16(A) to 16(C) are drawings for explaining the fixture metal mold, the movable metal mold, and the slider metal mold for molding the clip of the present invention. FIG. 17 is a perspective view for explaining the fixture metal mold, the movable metal mold, and the slider metal mold for molding the clip of the present invention. FIG. 18 is an exploded perspective view showing production procedures of the fixture metal mold and the movable metal mold for molding the clip of the present invention. In FIG. 16 and FIG. 18, the metal mold comprises an upper-portion fixture metal mold 1011, a lower-portion fixture metal mold 1012, an upper-portion movable metal mold 1021, and a lower-portion movable metal mold 1022. Also, the slider metal mold comprises a leg-portion slider metal mold 1111, a body-portion upper slider metal mold 1121, and a hinge slider metal mold 1131, which are pulled out upwardly; and a body-portion lower slider metal mold 1122 which is pulled out downwardly. Also, metal molds 1023 and 1024 shown in FIG. 18 are used when the flange portion 912 of the leg portion 91, the elastic attachment portions 916, and the cavities 917 are molded as necessary.

The leg-portion slider metal mold 1111 enters into an approximately central portion of the leg portion, and is pulled out upwardly. The body-portion upper slider metal mold 1121 enters into an approximately central portion of the body portion 92, and is pulled out upwardly. The hinge slider metal mold 1131 enters into the hinge portion, and is pulled out upwardly. The body-portion lower slider metal mold 1122 enters into a central portion of the body portion, and is pulled out downwardly. The aforementioned metal mold for producing the clip can simultaneously produce the clip in few operations by adeptly molding shapes of the fixture metal mold, the movable metal mold, and a plurality of the slider metal molds.

Structures of the leg portion 91, the flange portion 912, the vertical link portion 915, the horizontal link portion 925, and the body portion 92 are molded from the metal mold comprising the molding metal molds 1011, 1012, 1021, and 1022, and a plurality of the slider metal molds 1111, 1121, 1131, and 1122 for molding. Also, shapes and structures of the flange portion 912 including the leg portion 91, the vertical link portion 915, the horizontal link portion 925, and the body portion 92 of the present invention allow for a structure in which the molding metal mold (the movable metal mold) is only pulled in one direction of the dividing line, and also in which a plurality of the slider metal molds is only pulled in the up-and-down direction, so that not only the entire size of the metal mold can be reduced, but also a plurality of pieces of the molded articles can be simultaneously produced by few metal molds.

In FIG. 17, the leg-portion slider 1111 is pulled upwardly so as to mold the housing hole 911 of the leg portion 91. The body-portion slider 1121 is pulled upwardly so as to mold the through-bore 921 of the body portion 92. The hinge slider 1131 is pulled upwardly so as to mold in such a way that the vertical link portion 915 and the horizontal link portion 925 can turn in cooperation with the other metal molds. The body-portion lower slider 1122 is pulled downwardly so as to mold the body portion 92 with the body-portion upper slider 1121.

In FIG. 18, in the flange portion 912, the elastic attachment portions 916 and the cavities 917 are necessary in a lower portion of the flange portion 912 in order to facilitate an attachment of the bumper 93 and the plate-like member 94. Consequently, the metal molds 1023 and 1024 shown in FIG. 18 are necessary. The metal molds 1023 and 1024 can be deformed as necessary.

Figure 19:
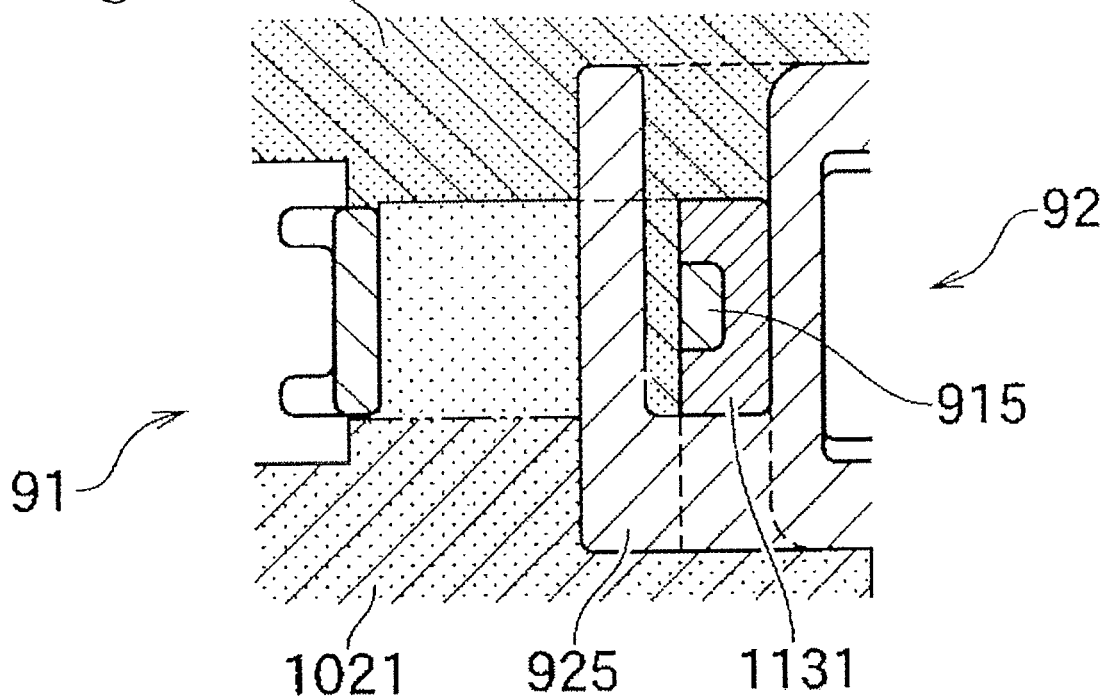
FIG. 19 is a drawing for explaining the metal mold for producing a link portion, and is a cross-sectional view taken along a line D to D in FIG. 16(A).
Figure 20:
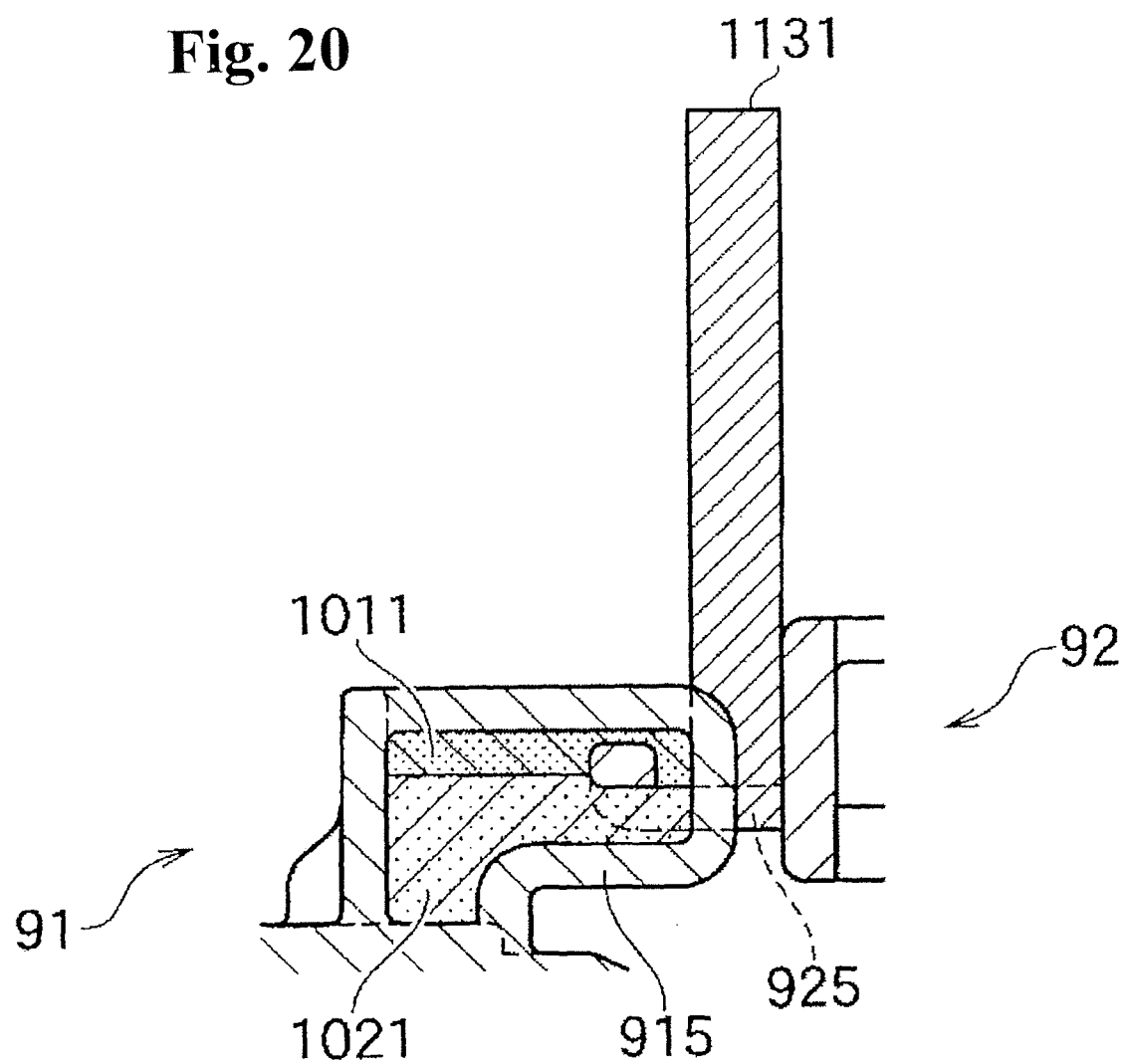
FIG. 20 is a drawing for explaining the metal mold for producing the link portion, and is a cross-sectional view taken along a line E to E in FIG. 16(B).
Figure 21:
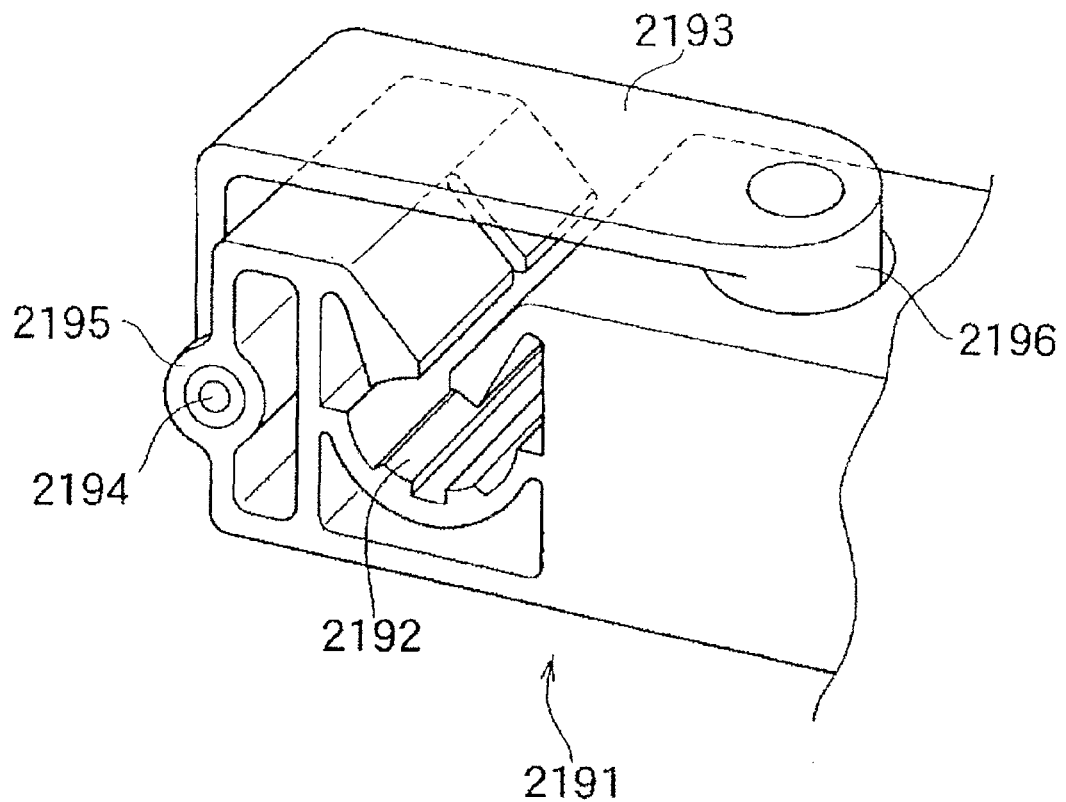
FIG. 21 is a drawing for explaining a conventional clip comprising a holding portion and a locking lid which turns.
Figure 22:
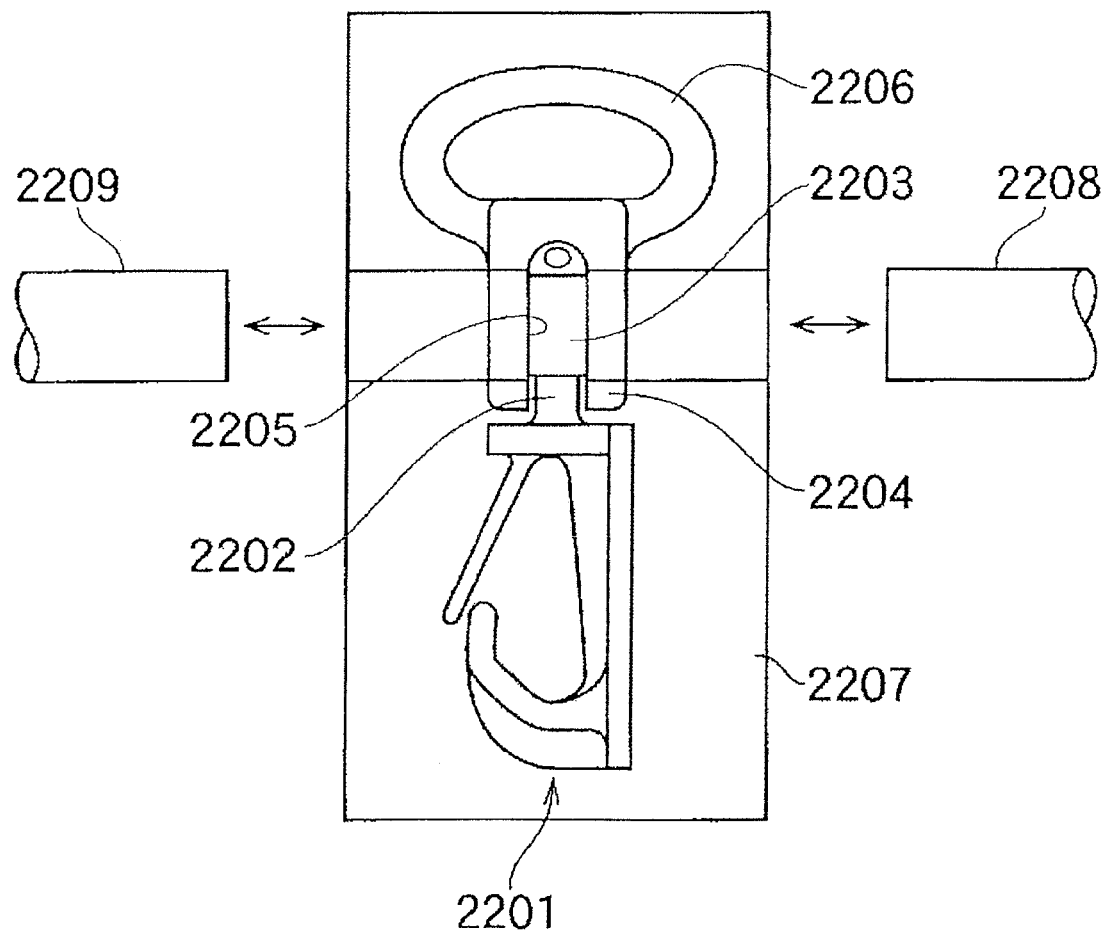
FIG. 22 is a drawing for explaining the slider metal mold when a conventional "carabiner" is produced.

FIG. 19 is a drawing for explaining the metal mold for producing a link portion, and is a cross-sectional view taken along a line D to D in FIG. 16(A). FIG. 20 is a drawing for explaining the metal mold for producing the link portion, and is a cross-sectional view taken along a line E to E in FIG. 16(B). In FIG. 19 and FIG. 20, the upper-portion fixture metal mold 1011, the upper-portion movable metal mold 1021, and the slider metal mold 1131 can mold the vertical link portion 915, and the horizontal link portion 925 in such a way as to be described in FIG. 4 to FIG. 7 of the first embodiment and an explanation thereof.

In FIG. 19, the horizontal link portion 925 includes the opening portion in which the vertical link portion 915 links. Also, in FIG. 19, the horizontal link portion 925 is molded in such a way that a thickness alternately differs in a near side and a back side relative to a length direction of a portion which becomes a swinging shaft. In the aforementioned structure, as shown in FIG. 18 to FIG. 20, when the upper-portion movable mold 1021 is pulled, a fixture portion and a turning portion can be simultaneously produced by the metal molds.

Although the embodiments of the present invention are described in detail in the above, the present invention is not limited to the aforementioned embodiments. Also, the present invention can carry out various design modifications provided that they do not exceed the subject described in a scope of claims. Obviously, as for the clip of the present invention, a shape and a size of each portion can be modified by the scope described in the scope of claims.

All contents of the specifications, claims, drawings, and abstracts of Japanese Patent Applications No. 2009-245571 filed on Oct. 26, 2009; No. 2010-137124 filed on Jun. 16, 2010; and No. 2010-153092 filed on Jul. 5, 2010 are cited in their entireties herein and are incorporated as a disclosure of the specification of the present invention.

What is claimed is:

1. A shaft support structure, comprising:
a base body having an attachment device adapted to fix an attached member;
a bearing portion provided at an end portion of the base body and having an opening portion;
a swinging shaft rotatably disposed inside the opening portion of the bearing portion; and
a lid body having the swinging shaft and rotated through the swinging shaft, said lid body being integrated with the base body,
wherein the lid body comprises a flat thin plate portion having a concave portion formed at a connecting portion connecting to the swinging shaft, and
a thickness of the thin plate portion differs in a front side and a back side in a length direction of the swinging shaft of the concave portion.

2. A clip for fixing an attached member, comprising:
a base body including a holding portion for fixably holding at least one of the attached members, an attachment portion for engaging with a connected member, and a retaining portion;
a bearing portion having an opening portion and extending outwardly from one side of the base body; and
a lid body including a locking portion lockable to the retaining portion formed at the other side of the base body, a rotating shaft rotatably disposed inside the opening portion of the bearing portion, and a planar member covering and holding the holding portion between the rotating shaft and the locking portion,
wherein the base body and the lid body are rotatably connected by the opening portion and the rotating shaft, and locked by the retaining portion and the locking portion, and
wherein the lid body further includes an elongated hole adjacent to the swinging shaft, said bearing portion passing through the elongated hole to rotationally hold the swinging shaft in the opening portion.

3. A shaft support structure, comprising:
a base body having an attachment device for fixing an attached member;
a bearing portion provided at an end portion of the base body and having an opening portion;
a swinging shaft rotatably disposed inside the opening portion of the bearing portion; and
a lid body having the swinging shaft and rotated through the swinging shaft, said lid body being integrated with the base body, wherein the lid body further includes an elongated hole adjacent to the swinging shaft, said bearing portion passing through the elongated hole to rotationally hold the swinging shaft in the opening portion.

4. A shaft support according to claim 3, wherein the base body and the bearing portion are integrally formed as one unit, and the lid body and the swinging shaft are integrally formed as one unit and are separated from the base body and the bearing portion.

5. A clip according to claim 2, wherein the base body and the bearing portion are integrally formed as one unit, and the lid body and the rotating shaft are integrally formed as one unit and are separated from the base body and the bearing portion.

* * * * *